INVENTOR.
JOHN O. PAIVINEN
BY
Fidler, Crouse & Beardsley
ATTORNEYS

INVENTOR.
JOHN O. PAIVINEN
BY
Fidler, Crouse & Beardsley
ATTORNEYS

MAGNETIC SHIFT REGISTER

Original Filed Dec. 7, 1953 6 Sheets-Sheet 3

*INVENTOR.*
JOHN O. PAIVINEN
*BY*
Fidler, Crouse & Beardsley
ATTORNEYS

INVENTOR.
JOHN O. PAIVINEN
BY
Fidler, Crouse & Beardsley
ATTORNEYS

Aug. 3, 1965 J. O. PAIVINEN 3,199,088

MAGNETIC SHIFT REGISTER

Original Filed Dec. 7, 1953 6 Sheets-Sheet 5

INVENTOR.
JOHN O. PAIVINEN

BY Fidler, Crouse & Beardsley

ATTORNEYS

MAGNETIC SHIFT REGISTER

Original Filed Dec. 7, 1953 6 Sheets-Sheet 6

INVENTOR.
JOHN O. PAIVINEN

BY
Fidler, Crouse & Beardsley
ATTORNEYS

United States Patent Office 3,199,088

Patented Aug. 3, 1965

3,199,088

MAGNETIC SHIFT REGISTER

John O. Paivinen, Palo Alto, Calif., assignor to Burroughs Corporation, Detroit, Mich., a corporation of Michigan Continuation of applications Ser. Nos. 396,603 and 396,605, Dec. 7, 1953, and Ser. No. 420,135, Mar. 31, 1954. This application Sept. 23, 1958, Ser. No. 762,863
93 Claims. (Cl. 340—174)

This application is a continuation of three earlier-filed, co-pending applications, Serial Nos. 396,603, 396,605 and 420,135 all now abandoned. The first, entitled Magnetic Shift Register, and the second, entitled Magnetic Device, were filed December 7, 1953. The third, also entitled Magnetic Device, was filed March 31, 1954 as a continuation-in part of a prior application Serial No. 396,604, filed December 7, 1953, now abandoned. All of these applications were filed in the name of the present inventor, John O. Paivinen.

This invention relates generally to registers and more specifically to shift registers which utilize magnetic elements as the means of storing information.

In the computing and business machine art, information storing registers are of considerable importance. Often it is desirable to store information in a register and subsequently to shift the information along from stage to stage in said register. Several types of registers are known in the prior art including mechanical, electromechanical, electronic, and magnetic shift registers. In many instances, due to their ability to maintain stored information without a constantly available power source and their substantially unchanging operating characteristics with wear and age, magnetic shift registers present the most advantages for particular applications. The known magnetic shift registers utilizing only two magnetic elements per stage are capable of shifting information in one direction only. A magnetic shift register utilizing two magnetic elements per stage and capable of shifting information in two directions would mark a definite improvement in the art.

Magnetic switching elements having cores, which exhibit a substantially rectangular hysteresis characteristic, have been used in shift registers of the prior art in the manner disclosed by A. D. Booth in an article entitled, "An Electronic Digital Computer," appearing in Electronic Engineering, for December 1950. The switching elements tend to remain in one or the other permanent magnetic remanence condition after being driven into magnetic saturation by signals presented at a winding about the element. The two states of magnetic remanence provided by these cores enable them to efficiently store binary information and retain it statically until it is removed. When an element is in one remanence condition, little voltage will be induced in the windings about the element by input signals of a polarity tending to establish the same remanence condition in the element. However, when the input signal is opposite in polarity to the storage state of the element, a high output voltage is induced in windings about the core element. Therefore, the elements may be interrogated with a signal of known polarity to determine their remanence condition and thereby read out the stored information. When this is done the core is reset to a predetermined remanence state which permits it to selectively receive further input information.

In these magnetic elements a signal is induced in all of the windings when the element is interrogated. Accordingly, magnetic storage elements have required external gating means for permitting transfer of the information only during the desired interrogation period. Although the information could be read out of a core into several circuits at the same time, there has been no internal conditional transfer means in the prior art provided for reading selectively into separate specified circuits which are coupled to different output windings about any one element.

Accordingly, it is an object of the present invention to effect conditional transfer from static magnetic storage elements.

Another object of the present invention is to provide an improved shift register capable of shifting information in two directions.

A general object of the invention is to provide improved magnetic storage elements.

A further object of the invention is the improvement of shift registers generally.

In general the invention provides means for conditionally transferring information from one magnetic core to another, one of which may be referred to as the transmitting core and the other as the receiving core. This is effected by providing two branch current flow paths in a coupling circuit between the magnetic core elements. Current flow through two such branch current flow paths acts to apply opposing magnetizing forces to at least the receiving core element. The opposing magnetizing forces are generally equal in magnitude when the two core elements are in a static condition. Thus, a conditional enabling current may be passed through the branch paths from an external source without disturbing the static storage condition in the cores. By means of potential induced in one of the windings in the transfer loop as a result of the flux change in the transmitting core while that core is being switched from one state to another during a dynamic switching operation, the current flow is unbalanced in the two branch paths so as to apply unbalanced magnetizing forces to the receiving core enough to establish a saturating magnetic flux in such receiving element so that the information is in effect transferred from the transmitting element to the receiving element. A pair of rectifiers are provided, one in each of the branch current paths, to pass the enabling current through each path between the elements in the same direction, so that there can be no circulating current flow in the loop. In this manner, therefore, information may be transferred from one element to another only when current is flowing in the transfer loop from the external source. Therefore, by passing current through the loop only during the advancing period, positive transfer of the information from one element to another is conditionally effected without coupling noise or information generated in the windings of either element during other switching conditions.

In accordance with another feature of the invention, a one stage register may readily be adapted to perform the function of a pulse transmitting magnetic core and a pulse receiving magnetic core wherein there will be no spurious output signals from said receiving magnetic core when a pulse is transmitted thereto from the pulse transmitting magnetic core.

In accordance with one embodiment of the invention the magnetic shift register is comprised of a plurality of magnetic cores arranged in a row and a plurality of coupling circuits each individually coupling together adjacent ones of the plurality of magnetic cores. Each of said coupling circuits comprises a tapped output winding on a given magnetic core and a tapped input winding on the next adjacent magnetic core in said row. A diode rectifier or other asymmetrical conducting device connects an end terminal of the tapped output winding to an end terminal of the tapped input winding, and a second asymmetrical conducting device connects the other end terminal of the tapped output winding to the other end terminal of the tapped input winding, the first and second asymmetrical conducting devices being connected so that their respective anodes are connected to end terminals of the same winding. Advance windings are individually wound on each of said plurality of magnetic cores. Each of said advance windings is connected to the tap of one of the windings of the next succeeding coupling circuit and to the tap of one of the windings of alternating coupling circuits. A first energizing source is provided to apply electrical pulses on a terminal of the advance winding of first magnetic core in the row of cores and a second energizing source is provided to apply electrical pulses on a terminal of the advance winding of the second magnetic core in said row. In this manner, current is passed through the intermediate transfer loop between the cores in time coincidence with the advancing or interrogation operation.

In accordance with a second embodiment of the invention similar coupling circuits are provided between the various magnetic cores arranged in a row and, in addition, a second coupling circuit is added betweeen each pair of adjacent magnetic cores. Each of these additional coupling circuits is similar to the coupling circuits of the first embodiment but these coupling circuits are connected in reverse order. Also, each core is provided with an additional advance winding. Corresponding terminals of each of the additional advance windings are connected to the additional coupling circuits in the same manner as in the first embodiment. A third energizing source is adapted to apply electrical pulses on a terminal of the added advance winding of the last magnetic core in the row of magnetic cores and a fourth energizing source is provided to apply electrical pulses on a terminal of the advance winding of the second to last magnetic core in the row of magnetic cores.

In accordance with a third embodiment of the invention the magnetic shift register is comprised of a plurality of magnetic cores arranged in a row together with a coupling circuit connecting each adjacent pair of cores, which coupling circuit comprises an output winding on each core and a tapped input winding on the next succeeding magnetic core. One terminal of each of the output windings is connected to one end terminal of the associated tapped input winding and the other terminal of each of said output windings is connected to the other end terminal of the associated input winding by circuit means. Such circuit means may include a first asymmetrical conducting device and a second asymetrical conducting device connected in such a manner that either the anode or the cathode of said first asymmetrical conducting device is connected to the said second terminal of the associated winding and the corresponding electrode of the said second asymmetrical conducting device is connected to the said second end terminal of the associated tapped input winding. Where many cores are included in the shift register, each junction between the first and second asymmetrical devices of each of said coupling means is connected to the tap of the tapped input winding associated with the magnetic core immediately preceding the two magnetic cores coupled together by the coupling means including the associated junction. Means are provided to apply electrical impulses to the taps of the said tapped input windings associated with the last magnetic core in said row and the next to last magnetic core in said row.

In accordance with a fourth embodiment of the invention herein identified as a reversible magnetic shift register the same structure is present as described in the said third embodiment of the invention and in addition there is comprised a second plurality of coupling means similar to the first plurality of coupling means, each of said second plurality of coupling means coupling together adjacent ones of said magnetic cores. Each of said second plurality of coupling means being connected in reverse manner to that of each of said first plurality of coupling means in that the first winding means are wound on individual magnetic cores and the associated tapped second winding means is wound on the immediately preceding magnetic core. Moreover, where many cores are employed, the junctions between the two asymmetrical devices of any coupling means of the second plurality is connected to the tap of the winding wound on the magnetic core immediately following the two magnetic cores coupled together by the one of said second plurality of coupling means including the associated junction. Means are provided to apply electrical pulses on the taps of the tapped windings of said second plurality of said coupling means and wound on said last and second to last magnetic cores in said row.

One common feature of each of these embodiments of the present invention is the use of rectifiers or asymmetrically conductive devices in the transfer circuit between each pair of magnetic core elements. In fact, no prior art magnetic shift registers are known to exist which do not utilize rectifiers of one type or another between stages. It would be advantageous therefore to have a magnetic shift register which eliminates the necessity of rectifiers inasmuch as rectifiers in such registers have been frequently unreliable because of their tendency to fail.

To this end an additional object of the present invention is to provide a magnetic shift register avoiding the necessity of rectifiers.

A further important object of the invention in this regard is to provide an improved magnetic shift register employing circuit coupling means between each pair of magnetic cores including a Wheatstone bridge type of transfer circuit.

In accordance with these objects of the invention, in a further embodiment of the invention a plurality of magnetic cores are arranged in a row and adjacent ones of the cores are coupled together by transfer circuits, each of which comprises an output winding on a given magnetic core, an input winding on the next adjacent magnetic core, and a substantially balanced bridge circuit comprising as its four legs a first impedance, a second impedance, a third impedance, and a fourth impedance, of which two of the impedances are of a non-linear type whose resistance will change with changes in the amount of electric current flow therethrough. The end terminals of each output winding are connected across two opposite terminals of the bridge circuit and the end terminals of the input winding are connected across the other two terminals of the bridge circuit. The bridge is so arranged that each of its four terminals has presented thereto a linear and a non-linear impedance. A third winding is wound on each of the magnetic cores. Each of the third windings is connected to a tap of one of the windings of the next succeeding transfer circuit and to a tap on one of the windings of alternate transfer circuits.

Thus, no asymmetrical conducting devices are utilized in this device but rather a bridge circuit, which becomes unbalanced when a sufficiently large current is passed therethrough, is utilized to effect shifting of stored information through the register from one stage to a succeeding stage.

These and other objects, advantages and features of the invention will be more fully understood from the following detailed description of the invention when read in conjunction with the drawings, in which:

In FIG. 2 information can be shifted in two directions;

In FIG. 9 information can be shifted in two directions;

Figure 1:
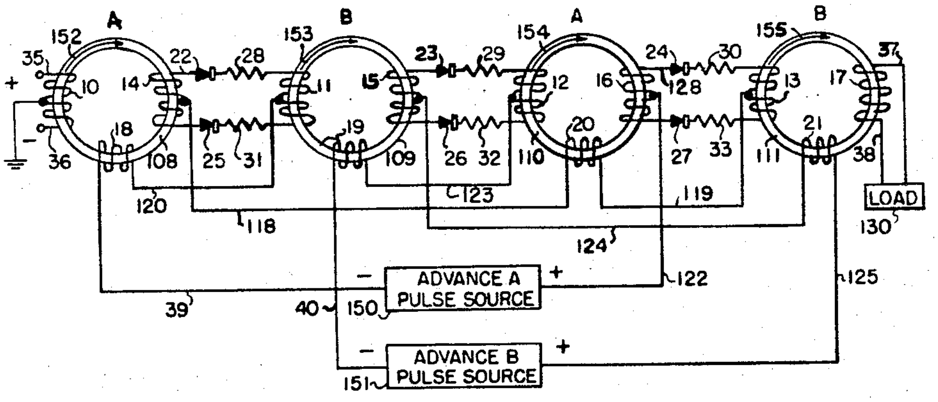
FIGS. 1 and 2 are schematic diagrams of embodiments of the invention utilizing one diode in each of two parallel branches of the transfer circuit between cores.

Referring now to FIG. 1, magnetic cores 108, 109, 110, and 111 constitute the storage means for information contained in the register and are composed of magnetic material having a substantially square wave hysteresis loop. Tapped input windings 10, 11, 12, and 13, which may or may not be center tapped, are wound respectively on cores 108, 109, 110 and 111. Tapped output windings 14, 15, 16 and 17 are wound respectively on cores 108, 109, 110, and 111. Adjacent magnetic cores are coupled together by coupling circuits. For example, cores 108 and 109 are coupled together by coupling circuits comprising tapped output winding 14, tapped inut winding 11, asymmetrical conducting devices 22 and 25, and resistors 28 and 31.

In the operation of the device, thus far described, the stored information is shifted along from magnetic core to magnetic core by alternate advance A and advance B pulses, derived from pulse sources 150 and 151, respectively, to apply current flow through conductors 39 and 40 to conductors 122 and 125. The circuit for the advance A pulse may be traced from the terminal to which the conductor 39 is connected, through winding 18, conductor 120, the parallel circuit comprising winding 11, asymmetrical conducting devices 22 and 25, resistors 28 and 31, and winding 14 of magnetic core 108, then through conductor 118, winding 20 of magnetic core 110, conductor 119, the parallel combination of winding 13, resistors 30 and 33, asymmetrical conductive devices 24 and 27, and winding 16 of magnetic core 110, and then through conductor 122 back to advance A pulse source 150. The circuit for the advance B pulse can be traced from the terminal to which the conductor 40 is connected through winding 19 of magnetic core 109, conductor 123, the parallel combination of winding 12 of magnetic core 110, the resistors 29 and 32, asymmetrical conductive devices 23 and 26, and winding 15 of magnetic core 109, then through conductor 124, winding 21 of magnetic core 111, and conductor 125 back to advance B pulse source 151.

In one preferred embodiment of the invention the following values and materials may be used. The magnetic cores have a cross-sectional area of about 0.00028 square inch, and a mean circumference of about 0.375 inch. The material used in the magnetic cores can be molypermalloy or any other suitable magnetic material having a substantially rectangular hysteresis loop. Tapped windings 10, 11, 12, and 13 each have 30 turns. Tapped output windings 14, 15, 16, and 17 each have 90 turns and windings 18, 19, 20, and 21 each have 23 turns. Asymmetrical conductive devices 22, 23, 24, 25, 26, and 27 are of the germanium diode type although other type asymmetrical conductive devices may be used. Resistors 28, 29, 30, 31, 32, and 33 each have a value of 18 ohms. The advance A pulses and the advance B pulses each have a duration of about 10 microseconds and an amplitude of about 200 milliamperes. It is to be noted that the above values may be changed in accordance with different desired designs.

Figure 2:
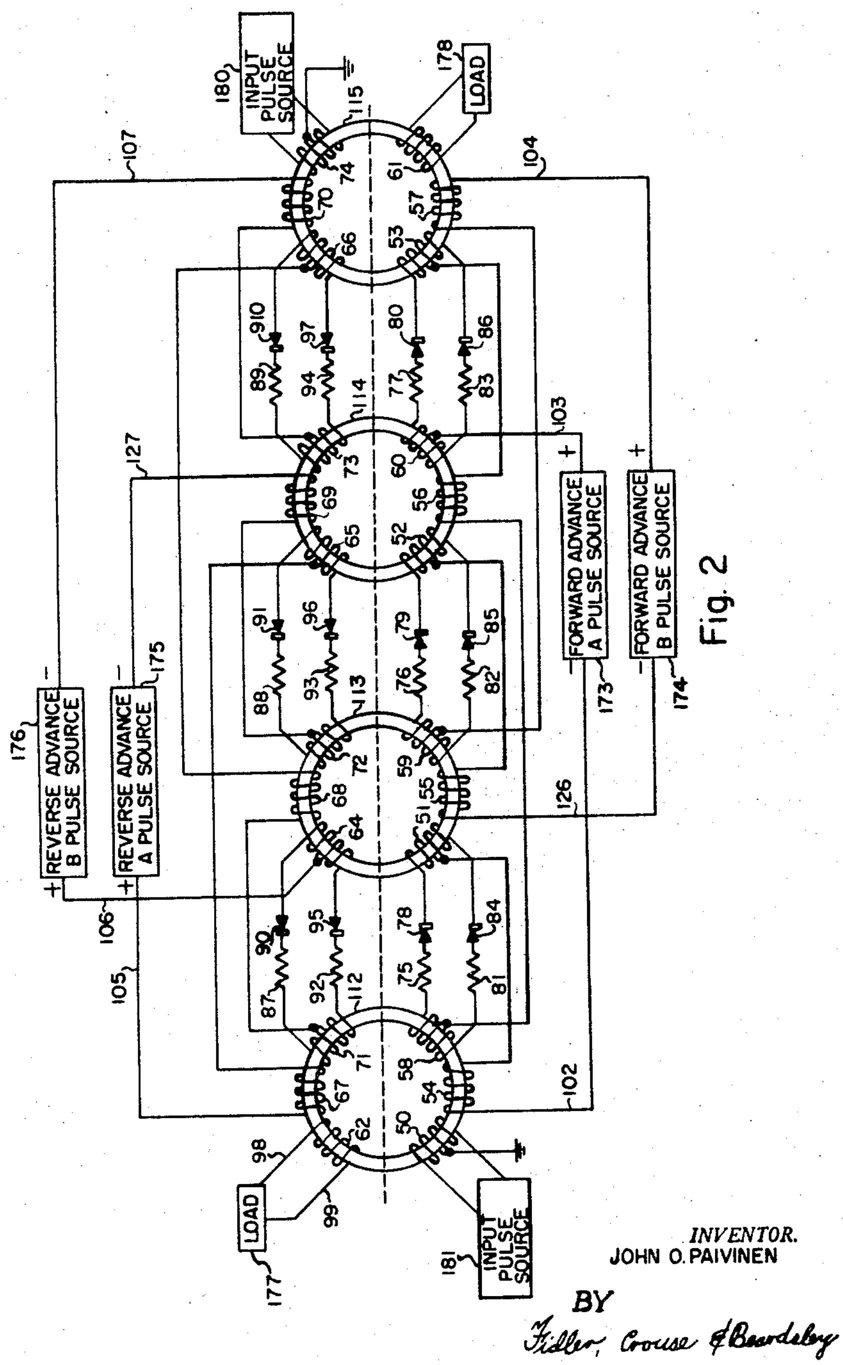

Referring now to FIG. 2, there is shown a reversible magnetic shift register. The circuitry below the dotted line is the same as the circuitry shown in FIG. 1. More specifically, input windings 50, 51, 52, and 53 of FIG. 2 correspond to input windings 10, 11, 12, and 13 of FIG. 1. Output windings 58, 59, 60, and 61 of FIG. 2 correspond to output windings 14, 15, 16, and 17 of FIG. 1. Windings 54, 55, 56, and 57 of FIG. 2 correspond to windings 18, 19, 20, and 21 of FIG. 1. Asymmetrical conductive devices 78, 79, 80, 84, 85, and 86 correspond to asymmetrical conductive devices 22, 23, 24, 25, 26, and 27 of FIG. 1. The resistances 75, 76, 77, 81, 82, and 83 of FIG. 2 correspond respectively to resistances 28, 29, 30, 31, 32, and 33 of FIG. 1. A load or utilization circuit 178 is connected across the winding 61, corresponding to utilization circuit 130 of FIG. 1. The circuitry below the dotted line of FIG. 2 is adapted to shift the stored information in a forward direction from left to right in the drawing. The advance A pulse source 173 is connected to the tap of winding 60 and to an end terminal of winding 54 by means of conductors 103 and 102. The advance B pulse source 174 is connected to the end terminals of windings 55 and 57 by means of conductors 216 and 104. Information is entered into the register by means of input pulse source 181 which is connected to input winding 50.

The circuitry above the dotted line in FIG. 2 is also the same as the circuitry in FIG. 1 except that it is reversed in order to shift the stored information in the opposite or reverse direction, i.e., from right to left instead of from left to right. Input windings 74, 73, 72, and 71 of FIG. 2 correspond respectively to input windings 10, 11, 12, and 13 of FIG. 1; output windings 66, 65, 64, and 62 of FIG. 2 correspond respectively to output windings 14, 15, 16, and 17 of FIG. 1; and windings 70, 69, 68, and 67 of FIG. 2 correspond respectively to windings 18, 19, 20, and 21 of FIG. 1. Asymmetrical conductive devices 910, 91, 90, 97, 96, and 95 of FIG. 2 correspond respectively to asymmetrical conductive devices 22, 23, 24, 25, 26, and 27 of FIG. 1 and resistors 89, 88, 87, 94, 93, and 92 correspond respectively to resistors 28, 29, 30, 31, 32, and 33 of FIG. 1. A load or utilization circuit 177 is connected across the winding 62. As can be seen from a comparison of FIGS. 1 and 2 the polarities of the asymmetrical devices of the circuitry above the dotted line in FIG. 2 are reversed from those of FIG. 1, although operation is identical with the asymmetrical devices connected in either polarity, the only difference being the direction of current flow through the respective circuits. Advance A pulse source 175 is connected to windings 67 and 69 by means of conductors 105 and 127 and the advance B pulse source 176 is connected to the tap of winding 64 and a terminal of winding 70 by means of conductors 106 and 107. Information is entered into the circuit by means of input source 180 which is connected to input winding 74.

The values of the circuit constants, the number of turns of the windings, and the material and dimensions of the magnetic cores 112, 113, 114, and 115 of the typical embodiment of the invention shown in FIG. 2 may be the same as the corresponding elements described in connection with FIG. 1.

Figure 5:
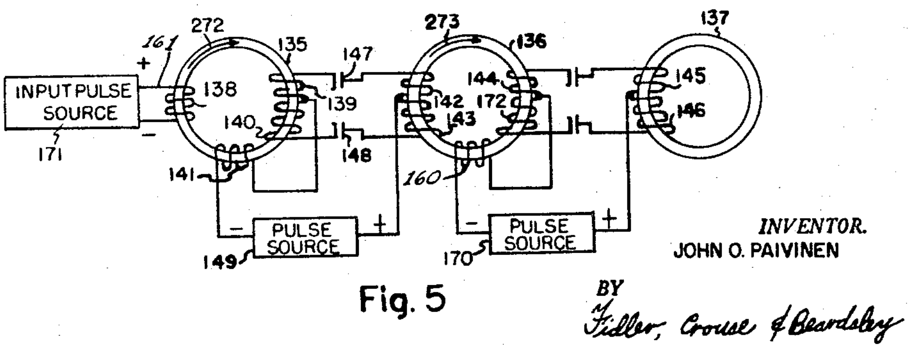
FIGS. 5 to 7 show schematic diagrams of different embodiments of the invention.

The manner in which noise generated in one of the magnetic elements is isolated is discussed in connection with FIG. 5, wherein information can be transferred from a transmitting magnetic core 135 to a receiving magnetic core 136 without creating spurious output signals in said receiving core in response to other operations within the transmitting core. In the embodiment of FIG. 5, magnetic core 137 constitutes the load of the device. Input winding 138 of core 135 is adapted to be energized by the source 171. The split output winding 139–140 of core 135 has its end terminals connected to the end terminals of the split input winding 142–143 of core 136 through asymmetrical conductive devices 147 and 148. The split output winding 144–172 of core 136 has its end terminals connected through two additional asymmetrical devices to the end terminals of the split winding 145–146 wound on magnetic core 137. Pulse source 149 is connected between a first terminal of winding 141 and the tap of split winding 142–143 of core 136. The second terminal of winding 141 is connected to the tap of split winding 139–140 of core 135. The pulse source 170 is connected between a first terminal of winding 150 and the tap of split winding 145–146 of core 137. The second terminal of winding 150 is connected to the center tap of winding 144–172.

Referring now to FIG. 1, the operation of the circuit shown therein will be described in detail. Assume that ordinarily information is stored in the "A" cores, i.e., magnetic cores 108 and 110. To shift a bit of stored information from core 108 to core 110 it is necessary to store it temporarily in "B" core 109. Assume that a binary bit of "0" is stored in magnetic core 108 which will be in a condition of negative remanence as arbitrarily indicated by magnetic flux of a direction opposite that of the arrow 152. Assume further that a binary bit of "1" is stored in magnetic core 110 which will be in a condition of positive remanence as indicated by magnetic flux in the direction of the arrow 54. "B" magnetic cores 109 and 111 will be in a state of negative remanence as indicated by magnetic flux in a direction opposite that of the arrows 153 and 155. If now a pulse is applied from the advance A pulse source 150 a current may be traced through conoductor 122, to the tap of winding 16. At this point, the current splits into two substantially equal parts during the period that the core remains in a static condition to apply equal and opposite magnetizing forces to the core. One part of the current flows through the upper half of the winding 16, asymmetrical conductive device 24, resistor 30, the upper half of the winding 13, to the tap of winding 13. The other part of the current flows through the lower half of winding 16, asymmetrical conductive device 27, resistor 33, the lower half of winding 13, to the tap of winding 13. The current path then continues through conductor 119, winding 20 of magnetic core 110, conductor 118, to the tap of winding 14 of core 108. At this point, the current again splits into two equal parts; one part flowing through the upper half of winding 14, through asymmetrical conductive device 22, resistor 28, the upper half of winding 11 to the tap of winding 11; and the other part of the current flowing through the lower half of winding 14, asymmetrical conductive device 25, resistor 31, the lower half of winding 11, to the tap of winding 11. The current path continues from the tap of winding 11 through conductor 120, winding 18 of core 108, and through conductor 39 back to the advance A pulse source 150.

It is to be noted that the advance current into the output windings 14 and 16 is at the taps and that the exit of the current from the input windings 11 and 13 is also at the taps of said input windings 11 and 13. Therefore, with center tapped windings, when the resistance of the diodes 24 and 27 are equal and the resistances 30 and 33 are equal, the electrical currents flowing through the two parallel paths joining the center tap of winding 16 with the center tap of winding 13 will be substantially equal. If, however, the current flow through winding 20 of core 110 causes the magnetic flux in the magnetic core 110 to change from positive remanence to negative saturation, a voltage will be induced in winding 16 of core 110 having its positive polarity on terminal 128 of winding 16 which will cause a positive current to flow in a circuit path extending from winding 16, through asymmetrical device 24, resistance 30, winding 13, resistance 33, asymmetrical device 27, and back to winding 16. This current is superimposed upon the advance A current. It is to be noted that ordinarily no appreciable current will flow through asymmetrical device 27 in a right to left direction. However, a decrease in the advance A current which is flowing in the opposite direction through the asymmetrical device 27 will be equivalent to a current flow in such direction. Thus, the effect of having the induced current flow in the direction of the high back impedance of asymmetrical device 27 is obtained. In actuality the advance A current through asymmetrical device 27 and the induced current flow therethrough have opposite polarities and tend to cancel each other out. The induced current and the advance A current flowing through asymmetrical device 24 add together so that the current flow through the upper half of winding 13 of core 111 is much greater than the current flow through the lower half of winding 13. This difference in current flow is made sufficient to cause the magnetic flux in magnetic core 111 to switch to a condition of positive saturation, and, upon cessation of the current pulse, to relax to a condition of positive remnanence, thus effectively transferring the binary bit of "1" from magnetic core 110 to magnetic core 111. As noted above, the magnetic core 110 was caused to assume a condition of negative remanence during this process.

A binary bit of "0" was stored in magnetic core 108. Consequently, when the advance A current pulse flows through winding 18 of core 108 the magnetic flux of core 108 is caused to change from a negative remanence to a negative saturation, and, upon cessation of the advance A pulse to relax to negative remanence. The voltage thereby induced in winding 14 is not great enough to unbalance the advance A current pulse flowing in the two halves of winding 11 to cause an appreciable change of magnetic flux in magnetic core 109. Thus, core 109 remains in a state of negative remnance as does core 108 and the binary bit of "0" has been effectively transferred from core 108 to core 109.

If now an advance B pulse is applied to lead 40 from source 151, the information stored in magnetic core 109 will be transferred to magnetic core 110 and the information stored in magnetic core 111 will be transferred out of core 111 into output winding 17 and the load 130, which could be another magnetic core element. The circuit for advance pulse B may be traced through conductor 125, winding 21 of magnetic core 111, conductor 124, to the tap of winding 15 of core 109. At the said tap, the current splits into two substantially equal parts; one part flowing through asymmetrical device 23 and resistance 29 to the tap of winding 12, and the other part flowing through asymmetrical device 26 and resistance 32 to the tap of winding 12. From the tap of winding 12, the current flows through conductor 123, winding 19, conductor 40, and back to the advance B pulse source 151. The binary bit of "1" stored in the core 111 and represented by a condition of positive remnance in core 111, is transferred to the load 130 when the advance B pulse flowing through winding 21 causes the magnetic flux to change from a condition of positive remnance to a condition of negative saturation. The advance B current flow from the tap of winding 15 to the tap of winding 12 is divided substantially equally between the two current paths connecting the two taps. When the advance B pulse flows through the winding 19 of magnetic core 109, the magnetic flux is caused to change from a condition of negative remanence to a condition of negative saturation. This change in the magnetic flux condition of magnetic core 109 is insufficient to induce a large enough voltage in winding 15 to cause any appreciable change in the magnetic flux condition of magnetic core 110. Thus, the "0" bit of information stored in magnetic core 109 is effectively transferred to magnetic core 110.

Figure 3:
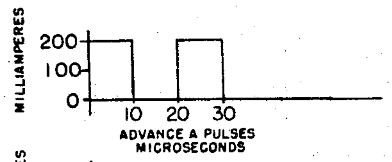
FIGS. 3 and 4 show typical waveforms of advance A pulses and advance B pulses for use in connection with the circuits of FIGS. 1 and 2.
Figure 4:
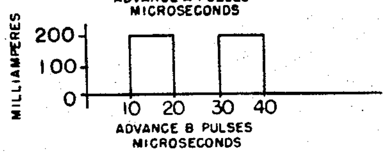

Typical advance A pulses and advance B pulses are shown in FIGS. 3 and 4. The time spacing between an advance A pulse and an advance B pulse can be zero or any longer amount of time desired.

The circuitry above the dotted line in FIG. 2 causes the information to be shifted in the same manner as described with respect to the circuitry shown in FIG. 1, except that in FIG. 2 the circuitry above the dotted line shifts the information from right to left as discussed hereinbefore. Thus, in the circuit of FIG. 2 information can be shifted from magnetic core 112 to magnetic core 114 by application of an advance A pulse from source 173 and then an advance B pulse from source 174 upon conductors 103 and 104 respectively. If it is then desired to shift the information from magnetic core 114 back to magnetic core 112, this may be accomplished by application of an advance A pulse and then an advance B pulse upon conductors 105 and 106 respectively.

Referring to FIG. 5 the operation of the circuit shown therein will be described in detail. Assume that the arrows 272 and 273 indicate the direction of positive magnetic flux in said magnetic cores 135 and 136. Assume further that the magnetic cores 135, 136, and 137 are in a condition of negative remanence. A positive pulse applied from source 171 to terminal 161 of winding 138 will cause the magnetic core 135 to assume a condition of positive magnetic saturation. When the pulse source 149 is energized to cause a pulse to flow through the winding 141 then the core 135 will be caused to assume a condition of negative remanence upon cessation of the pulse, and the magnetic core 136 will be caused to assume a condition of positive remanence upon cessation of said pulse in accordance with the description of operation of FIG. 1. There will be no output from winding 144–172 at this time because of the isolation afforded by the conditional transfer nature of the output circuit including associated asymmetrical devices between cores 136 and 137, which prevent circulating current flow within the transfer loop. When a pulse is applied to the winding 160 from source 170, the core 136 will be caused to assume a negative remanence upon the cessation of the pulse and the load core 137 will be caused to assume a positive magnetic remanence in accordance with the description of operation of FIG. 1. In the above example, core 135 is designated as the transmitting core and core 136 as the receiving core. It is possible, by this arrangement, therefore, to transmit a pulse from a transmitting core 135 to a receiving core 136 without having spurious output voltages generated in the output winding of the receiving core 136.

Figure 6:
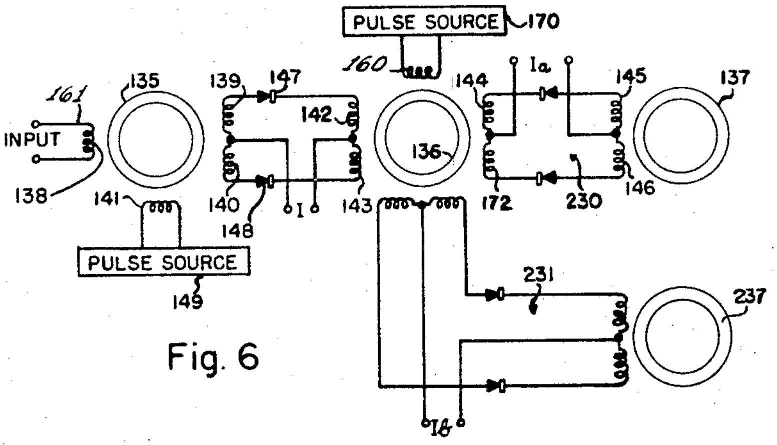

In the foregoing embodiments of the invention, the advancing windings have been connected for operation by the same current which flows through the transfer loop, so that a coincidence timing relationship might be effected. However, as shown in FIG. 6, such connection is not necessary in the more general operation of the invention. For the purpose of comparing this embodiment with that shown in FIG. 5, the same reference characters are used where possible to indicate similar elements of the invention. Assume that the current I flows in the transfer loop between elements 135 and 136 in the direction established by orientation of the diode rectifiers 147 and 148. As before described, the current will be evenly divided in the two branches so that opposing magnetizing forces will be applied by the split windings to both element 135 and element 136, and accordingly the storage state of the cores remains undisturbed. However, when a change in the remanence condition occurs in core 135 by application of an advancing pulse from source 149 to winding 141, a potential is induced in the entire winding 139–140, which aids the current flow in one branch and opposes the current flow in the other branch circuit, and causes a resulting unbalance of magnetizing force being applied to element 136 such that the remanence condition of element 136 is changed to correspond with that information which has been removed from element 135 by the advancing pulse. This action will take place no matter what the polarity of the induced potential in the winding 139–140 and, therefore, the storage condition of element 136 will be changed along with that of element 135 so long as the current I flows through the transfer loop. The current may thus be considered an enabling condition for effecting transfer of information from one element to another. In operation this device is similar to that shown in connection with FIG. 5 in that coincidence of current flow through winding 141 and the transfer loop must occur in order to effect a transfer of information, even though the winding does not need to be connected in the same current flow path. In some cases the amount of current flow through winding 141 would be different from that desired within the transfer loop, and therefore this more general embodiment of the invention affords more latitude in the engineering design of the conditional transfer loops afforded by this invention.

By means of such conditional transfer loops, information may be transferred to two or more additional core elements, such as elements 137 and 237, upon the application of a normal advancing pulse derived at winding 160 from pulse source 170, depending upon whether an enabling current I*a* or I*b* is flowing in the respective transfer loops generally indicated at 230 and 231. This specific embodiment of the invention is more specifically described and claimed in an application Serial No. 683,676 (now Patent No. 2,943,301), entitled, "Magnetic Shift Register," filed September 10, 1957, by David Loev, William Miehle and Joseph Wylen, now Patent No. 2,943,301. It is noted that the rectifiers in each of the loops 230 and 231 are reversed with respect to one another without effect on the transfer operation. The only criterion for transfer is the condition that current be flowing in the loops at the time the element 136 is interrogated by the pulse source 170. In this same manner the information already transferred from core element 135 to core element 136 may be restored to core 135 by applying current I during the duration of the pulse from source 170. This specific embodiment of the invention is more specifically described and claimed in an application by David Loev, Serial No. 452,753, filed August 30, 1954, and entitled, "Reversible Shift Register," now abandoned in favor of continuation application Serial No. 763,157 (now Patent No. 3,023,401).

Figure 7:
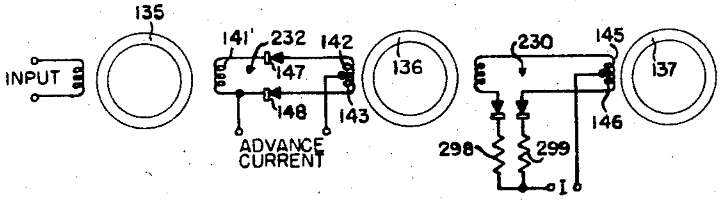

In order to combine the advantageous features of both the embodiments of FIGS. 5 and 6 a further embodiment shown in FIG. 7 is provided, wherein a minimum number of windings are coupled in the transfer loop. In this embodiment of the invention the advance winding 141′ is made to serve both as an advance winding and as an output winding, the function hereinbefore provided by the tapped winding 139–140 of FIG. 5. In the circuit of FIG. 7, the current flowing through the two sections 142 and 143 of the tapped winding on element 136 during the static remanence condition will cause current of one section or branch only to flow through the advance winding 141′. This will cause a change of remanence condition in element 135 if a bit of "1" information is stored in the core, and accordingly upset the balance of current flowing in winding 142–143 so that the information is shifted to element 136 in the manner hereinbefore described. However, when core 135 does not contain a bit of "1" information the current flow is substantially balanced and the loop also behaves in the same manner hereinbefore described to effectively transfer the bit of "0" information to core 136. Since the impedance may be slightly unbalanced in this type of circuit because winding 141′ appears in only one of the branch paths, compensation for such unbalance may be had either by placing the tap of the split winding off-center or by the use of the external resistors 298 and 299, to equalize current flow during the static remanence condition. This particular embodiment of FIG. 7 is described in more detail with reference to FIGS. 8 and 9.

With the embodiment of FIG. 7 a slight unbalance of the windings 142 and 143 may be desirable, so that the enabling current flow through the transfer loop 232 will tend to send the core 136 into saturation in its preset or read-out storage state. This will permit faster switching speeds with the system since the enabling current of the succeeding transfer loop 230 need not be continued after switching of element 137 until the element 136 is completely switched, but may be foreshortened to permit the enabling current of transfer loop 232 to continue the switching to the preset state when no information transfer occurs from element 135.

In each of the described embodiments of the invention, transfer of information between two cores is effected by means of biasing one of the diode rectifiers in the transfer loop in a direction tending to inhibit the flow of enabling current there-through, so that a corresponding unbalance of magnetizing force applied by the split windings causes switching of the remanence condition in the receiving core. By selectively biasing the diodes in the transfer loop therefore conditional transfer of information into one of several circuits may be effected. In addition, the conditional transfer techniques taught by the invention afford isolation of receiving circuits from switching noise voltages or other operational potentials developed in transmitting circuits.

Figure 8:
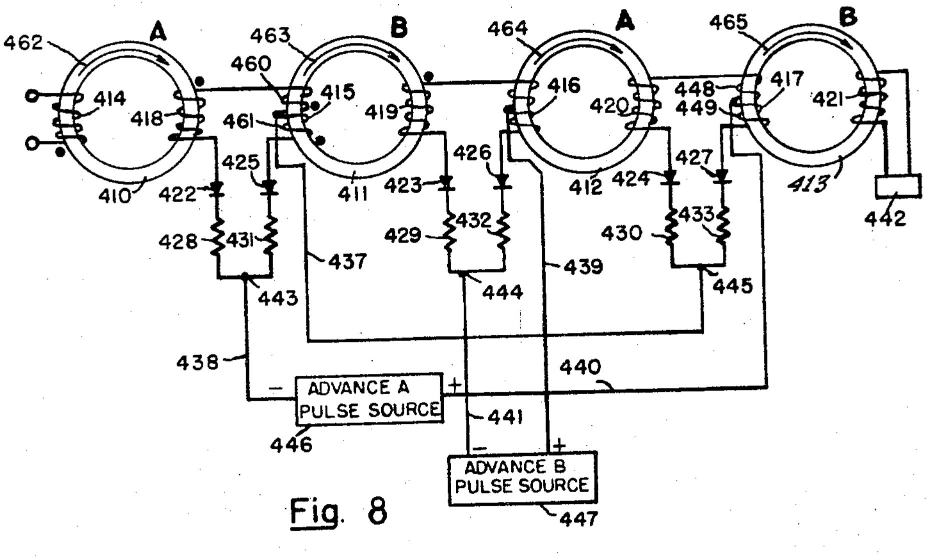
FIGS. 8 and 9 are schematic diagrams of embodiments of the invention also utilizing a diode in each of two parallel branches of the transfer circuit between cores.

Referring more specifically to the embodiment of FIG. 8, a plurality of magnetic core elements 410, 411, 412 and 413 are arranged in a row which is their usual disposition in computing equipment. Each one of the two cores has an input and an output section which may be characterized by a separate winding on the cores. Input winding 414 and center tapped input windings 415, 416 and 417 are wound around the magnetic cores 410, 411, 412 and 413, respectively. Input pulses are applied to the terminals of input winding 414. Output windings 418, 419, 420 and 421 are wound around cores 410, 411, 412 and 413 preferably in displaced relation to the input windings as shown.

Each of output windings 418, 419 and 420 is connected to the input winding of the next adjacent magnetic core through a circuit including two asymmetrical conducting devices and two resistive means. For example, one terminal of output winding 418 of magnetic core 410 is connected to one end terminal of input winding 415 of magnetic core 411. The other terminal of winding 418 is connected to the other end terminal of winding 415 through a circuit means comprising asymmetrical conducting device 422, resistive means 428, junction 443, resistive means 431, and asymmetrical conducting device 425. The anodes of asymmetrical devices 422 and 425 are connected respectively to the winding 418 and the winding 415. Junction point 443 is located between resistive means 428 and 431. Similar circuitry exists between output winding 419 of core 411 and input winding 416 of core 412 including asymmetrical conducting devices 423 and 426, resistors 429 and 432, and junction 444. Another similar circuit exists between output winding 420 of core 412 and input winding 417 of core 413 including asymmetrical conducting devices 424 and 427, resistors 430 and 433, and junction 445. Output winding 421 of core 413 is connected to a load 442. It is to be noted that tapped input windings 415 and 417 have reference characters thereon denoting the two portions of each tapped winding. More specifically, the two portions of winding 415 are denoted by reference characters 460 and 461 and the two portions of winding 417 by reference characters 448 and 449.

An advance pulse source, herein identified as Advance A Pulse Source 446, is adapted to cause a current flow through a circuit extending from the source through conductor 440 to the centar tap of input winding 417 of core 413. From this center tap the current can flow in two paths to junction 445. One of these circuits extends from the center tap of winding 417, through the upper half 448 of winding 417, winding 420 of core 412, diode rectifier or similar asymmetrically conducting device 424, resistor 430, to junction 445. The other of these two circuits extends from the center tap of winding 417, through the lower portion 449 of winding 417, asymmetrical conducting device 427, resistor 433, to junction 445. From junction 445 the advance A pulse circuit extends through conductor 437 to the center tap of input winding 415 of core 411. From the center tap of winding 415 the current can flow in two paths to junction 443. One of these two paths may be traced from the center tap of winding 415, through the upper portion 460 of winding 415, winding 418 of core 410, asymmetrical conducting device 442, resistor 428, to junction 443. The other of these two circuits extends from the center tap of winding 415, through the lower portion 461 of winding 415, asymmetrical conducting device 425, resistor 431, to junction 443. From junction 443 the advance A pulse current path can be traced through conductor 438 to advance A pulse source 446.

A second pulse source, herein identified as Advance B Pulse Source 447, is adapted to cause a current flow through conductor 439, to the center tap of winding 416 of core 412. From the center tap of winding 416 the current can flow in two paths to junction 444. A first of these two circuits can be traced from the center tap of winding 416 through the upper portion of winding 416, winding 419 of core 411, asymmetrical conducting device 423, resistor 429, to junction 444. The second of these two circuits extends from the center tap of winding 416, through the lower portion of winding 416, asymmetrical conducting device 426, resistor 432 to junction 444. From junction 444 the advance B pulse current path may be traced through conductor 441 back to the advance B pulse source 447.

Figure 9:
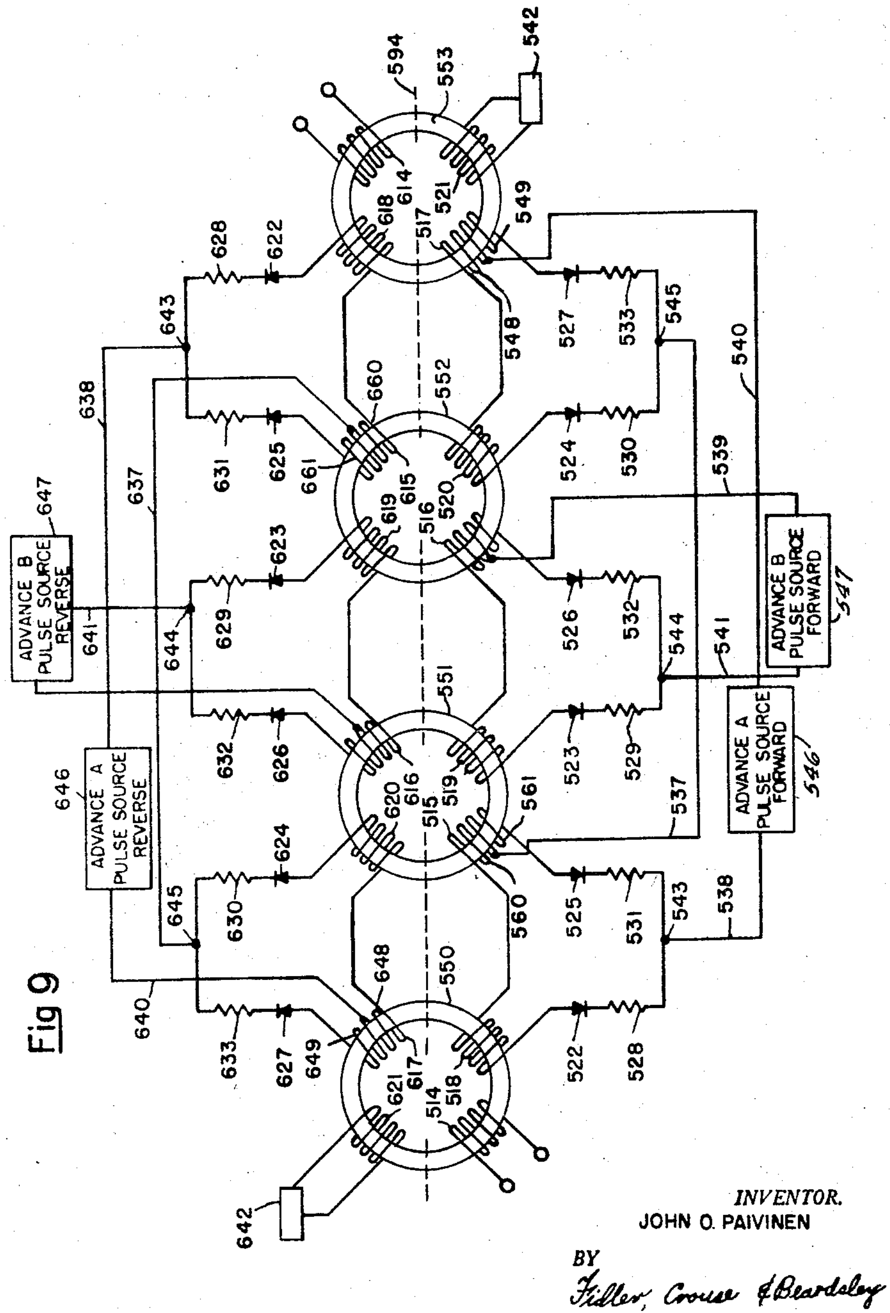

Referring now to FIG. 9, magnetic cores 550, 551, 552 and 553 may be of the same material, size and shape as the magnetic cores of FIG. 8. The circuitry below the dotted line 594 is the same as the circuitry shown in FIG. 8 and the values may also be the same. The elements of the circuitry below the dotted line 594 in FIG. 9 have the same reference number plus "100" as the corresponding elements of the circuitry of FIG. 8. For example winding 418 of FIG. 8 corresponds to winding 518 of the circuitry below the dotted line in FIG. 9. The circuit paths for the advance A pulses and the advance B pulses are the same as for the circuitry of FIG. 8.

It is to be noted that the device shown in FIG. 9 is a reversible magnetic shift register and that circuitry below the dotted line 594 causes the stored information to shift from left to right while the circuitry above the dotted line causes the information to shift from right to left. The circuitry above the dotted line 594 is the same as the circuitry shown in FIG. 8 except that it is reversed; i.e., for example, the input winding 414 of core 410 of FIG. 8 corresponds to the input winding 614 of core 553 of FIG. 9 and output winding 421 of core 413 of FIG. 8 corresponds to the output winding 621 of core 550 of FIG. 9.

The circuit elements of the circuitry shown in FIG. 8 have reference characters of the corresponding circuit elements of the circuitry shown above the dotted line 594 of FIG. 9 except that the reference characters of the circuitry shown above the dotted line in FIG. 9 have "200" added to them. For example, the advancing pulse sources 446 and 447 and associated circuitry correspond to the advancing pulse sources 646 and 647 of FIG. 9 respectively.

The structure shown in both FIG. 8 and FIG. 9 can be divided into two stages which can arbitrarily be identified as stage A and stage B to correspond to the advance A pulse and the advance B pulse. More specifically, the magnetic cores which are energized directly by the advance A pulse are herein identified as stage A cores and the magnetic cores which are energized directly by the advance B pulse are herein identified as stage B cores, as designated in FIG. 8.

Referring again to FIG. 8 the operation of the circuit shown therein will be described in detail. Assume that a binary bit of "1," represented by a condition of positive remanence of the magnetic core in which it is stored, is caused to be entered into magnetic core 410 by application of an input pulse upon input winding 414. The positive remanence condition is indicated by the direction of arrows 462, 463, 464 and 465 in cores 410, 411, 412 and 413 respectively. Assume further that all the remainder of the magnetic cores 411, 412 and 413 are in a condition of negative remnaence or opposite to the remanence condition represented by arrows 463, 464 and 465. If now an advance A pulse is applied to conductor 440 the binary bit of "1" stored in magnetic core 410 will be transferred to magnetic core 411, and the binary bit of "0" stored in magnetic core 412 will be transferred to magnetic core 413 in the following manner. The advance A pulse will flow to the center tap of winding 417. From this center tap the advance A pulse can flow in two paths to the junction 445 as hereinbefore described. The portion of the current flowing through the upper portion 448 of winding 417 of core 413 and winding 420 of core 412 will encounter a substantially zero impedance in winding 420 since the said current flow therethrough will tend to cause the magnetic core 412 to become saturated in a negative polarity, whereas said core 412 is already in a condition of negative remanence. The other portion of the current flows through the lower portion 449 of the winding 417 of core 413. The resistances 430 and 433 and the upper portion 448 and lower portion 449 of winding 17 are so proportioned that $$I_1N_{448} \geqq I_2N_{449} \quad \text{(Equation 1)}$$

where $I_1$ is the portion of the advance A pulse flowing through winding 448, $N_{448}$ is the number of turns in winding 448, $I_2$ is the portion of the advance A pulse flowing through winding 449, and $N_{449}$ is the number of turns in winding 449. The effect of this design is either to force the magnetic core 413 to the negative magnetic flux state (inequality in Equation 1) or else to cause no change (equality in Equation 1). Therefore, the transfer of a binary bit of "0" has been effected from the A stage magnetic core 412 to the B stage magnetic core 413.

It is to be noted that the current flowing through winding 420 of core 412 may induce a voltage in winding 416 if a change in magnetic flux occurs but that no current will flow in winding 416 due to asymmetrical conducting devices 423 and 426. Thus, no undesired reverse flow of information will occur.

Returning to the path of the advance A pulse, the current will flow from junction 445, through conductor 437, to the tap of winding 415. At this point the current can flow in two different paths to junction 443 as described hereinbefore. It is to be noted that stage A core 410 contains a binary bit of "1" and this is in a condition of positive remanence and that stage B magnetic core 411 is in a condition of negative remanence. The portion of the advance A pulse flowing through the upper poriton 460 of winding 415 encounters a high impedance in winding 418 of core 410 since the said current tends to cause the magnetic flux in said core 410 to change from a condition of positive remanence to a condition of negative saturation which, upon cessation of the current pulse, will relax to a condition of negative remanence. As a result of this high impedance the current flow through winding 460 is less than in the case of a zero transfer and the current flow through winding 461 is greater than in the case of a zero transfer. The design of the circuit is such that the following equation holds true:

$$I_3N_{461} > I_4N_{460} \quad \text{(Equation 2)}$$

where $I_3$ is the portion of the advance A pulse current flowing through the lower portion 461 of winding 415 and $I_4$ is the portion of the advance A pulse current flowing through the upper portion 460 of winding 415 when a high impedance state is encountered in winding 418.

As a result of the advance A pulse and in accordance with Equation 2 the stage B core 411 will change from a condition of negative remanence to a condition of positive remanence and the core 410 will change from a condition of positive remanence to a condition of negative remanence; thus effectively transferring the binary bit of "1" from core 410 to core 411. The design of the circuit further is such that core 411 will change completely to the positive saturation condition before core 410 completely changes to a negative saturation condition. The advance A pulse is preferably terminated before core 410 completes its change to the "0" or negative saturation condition.

Therefore, as described above, the magnetic cores in the system are reliably changed to the "1" condition (positive remanence) and cores previously containing "1's" are positively returned to the "0" condition (negative remanence).

In a similar manner information temporarily stored in the stage B cores is transferred to the next succeeding stage A cores by application of an advance B pulse upon conductor 439 from advance B pulse source 447. Since the means and the operation of transferring "0's" and "1's" from a stage B core to a stage A core or from a stage A core to a stage B core are the same, a detailed explanation of the operational process of transferring "0's" and "1's" from stage B cores to stage A cores is not presented herein.

Figure 10:
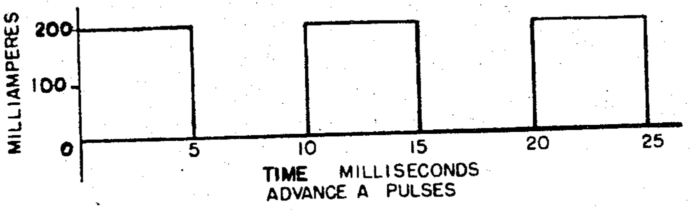
FIGS. 10 and 11 show typical advance A and advance B pulses for use in the FIG. 8 and 9 embodiments.
Figure 11:
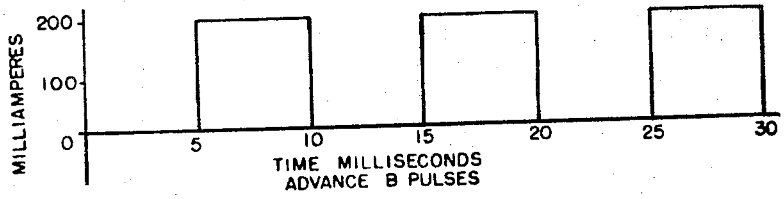

Typical advance A pulses and advance B pulses are shown in FIGS. 10 and 11 respectively. The A and B pulses alternate with one another as shown in FIGS. 10 and 11 and should not be coincident in time. It is to be noted that no time interval is required between successive advance A and advance B pulses. A time interval of any desired length can be used, however.

Referring now to FIG. 9, the operation of the circuit shown therein will be discussed. As stated hereinbefore, the circuit elements of the circuitry of FIG. 8 corresponds to the circuit elements of the circuitry below the dotted line 594 of FIG. 9 having the same reference characters but prefixed by a "5" instead of "4." This circuitry of FIG. 9 below the dotted line 594 operates in the manner as the circuitry of FIG. 8 to shift information from left to right and the description of operation of FIG. 8 is herein incoprorated as the description of operation of the circuitry below the dotted line in FIG. 9.

Similarly, the circuitry above the dotted line in FIG. 9 is the same as the circuitry in FIG. 8 except that it is connected in reverse order as explained hereinbefore. Since the operation is the same as described in connection with FIG. 8 said operational description is herein incorporated with respect to the circuitry above the dotted line 594 in FIG. 9. It is to be noted that the circuit elements of FIG. 8 corresponding to circuit elements of the circuitry above the dotted line 594 in FIG. 9 have corresponding reference characters except that the reference characters of the circuitry above the dotted line in FIG. 9 are prefixed by the number "6" instead of "4."

Thus, information stored in magnetic cores is capable of being shifted in opposite directions or either to the right or to the left by means of the device shown in FIG. 9.

Figure 12:
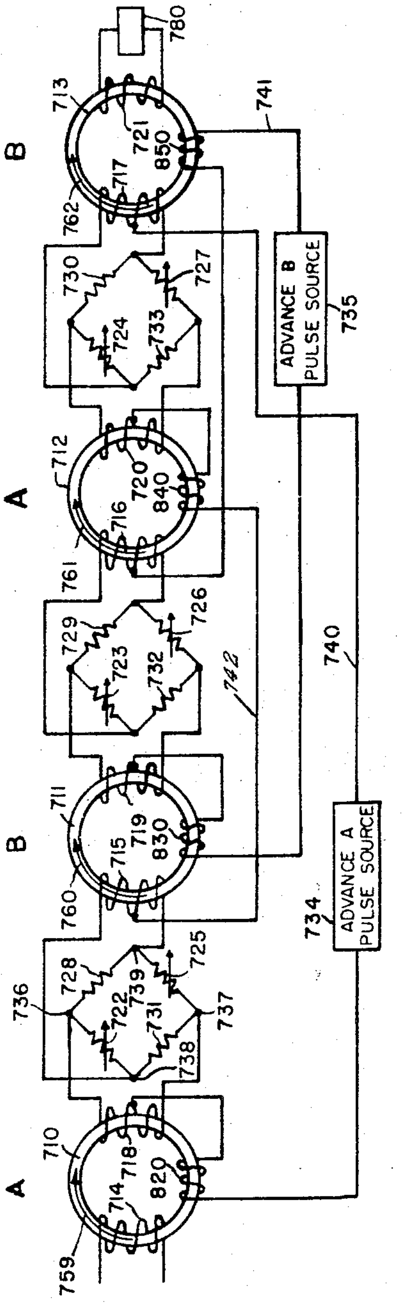
FIG. 12 is a schematic diagram of a further embodiment of the invention utilizing an impedance bridge in the transfer circuits between cores.

Referring to FIG. 12, there is shown a row of magnetic cores in this instance comprising four magnetic core elements 710, 711, 712 and 713. Each core is preferably formed of magnetic material having a substantially square hysteresis loop characteristic. Each core element has an input and an output winding. The input windings for the cores 710, 711, 712 and 713 are indicated at 714, 715, 716 and 717 respectively, and the output windings for the cores are indicated at 718, 719, 720 and 721 respectively. The input windings 715, 716 and 717 are center tapped and the output windings 718, 719 and 720 are center tapped. An additional winding is applied to each core. Windings 820, 830, 840 and 850 are wound respectively on cores 710, 711, 712 and 713.

Each core is coupled to the immediately succeeding core by a transfer circuit or loop which is designed to eliminate rectifiers and for this purpose a Wheatstone bride type of circuit is employed having resistances therein which vary in accordance with the amount of current flow therethrough. Each Wheatstone bridge circuit comprises, as customarily, four resistances. However, to accomplish the objects of this invention two oppositely positioned resistances of the bridge circuit are of the non-linear type, i.e., the ohmic values thereof change with current flow therethrough. A desirable form of such non-linear resistance is a Thyrite element.

In the several bridge circuits the non-linear resistances are identified at 722 to 727 inclusive and the linear resistances at 728 to 733 inclusive. The resistances 722 through 733 form a plurality of Wheatstone bridge circuits, each of which couples together adjacent ones of said magnetic cores. For example, core 710 is coupled to core 711 by a bridge circuit comprising linear resistances 728 and 731 and non-linear resistances 722 and 725. The resistances 722, 728, 725 and 731 are so connected that each of the four junctions of the bridge circuit has presented thereto a linear and a non-linear resistance. The two end terminals of output winding 718 or core 710 are connected to opposite junctions 736 and 737 respectively of the bridge circuit. The end terminals of input winding 715 of core 711 are connected respectively to the other two junctions 738 and 739 respectively of the bridge circuit. Similar bridge circuits are used to couple core 711 to core 712 and core 712 to core 713.

Two pulse sources are shown for advancing the stored information from core to core. Advance A pulse source 734 and advance B pulse source 735 are adapted to apply electrical pulses to conductors 740 and 741 respectively. The pulses from the A and B sources are applied at alternate periods of time to the shift register. The advance A pulse current path may be traced from source 734 through conductor 740, to the center tap of winding 717. From this center tap the advance A current flows in two parallel paths to the center tap of winding 720 of core 712. The first of these two paths may be traced from the tap of winding 717, through the upper portion of winding 717 and then in parallel through non-linear resistance 724 and linear resistance 733 to the first and second end terminals respectively of winding 720, and then to the center tap of winding 720. The second of these two paths may be traced from the center tap of winding 717 of core 713 through the lower portion of winding 717, then in parallel through linear resistance 730 and non-linear resistance 727 to the two end terminals of winding 720 and then in parallel through the two portions of tapped winding 720 to the center tap of winding 720. From the center tap of winding 720 the advance A pulse flows through winding 840 to the center tap of winding 715 of core 711. From the center tap of winding 715 the advance A pulse current path separates into two paths. The first of these two paths may be traced from the center tap of winding 715, through the upper portion of winding 715, then in parallel through non-linear resistance 722 and linear resistance 731 to junctions 736 and 737, and thence in parallel through the upper and lower portions of tapped winding 718 of core 710 to the center tap of winding 718. The second of these two paths may be traced from the center tap of winding 715 through the lower portion of winding 715, then in parallel through non-linear resistance 725 and linear resistance 728 to the junctions 736 and 737, and thereafter through the upper and lower portions of tapped winding 718 of core 710 to the center tap of winding 718. From the center tap of winding 718 the advance A pulse current flows through winding 820 of core 710 and returns to the advance A pulse source 734.

The advance B pulse source current path may be traced from advance B pulse source 735, through conductor 741, winding 850 of core 713 to the center tap of winding 716 of core 712. From the center tap of winding 716 the current path can be traced to the center tap of winding 719 of core 711 in two current paths. The first of these paths comprises the upper portion of winding 716 and the parallel combination of non-linear resistance 723, linear resistance 732, and the upper and the lower portions of winding 719. The second of these two paths comprises the lower portion of winding 716 and the parallel combination comprising non-linear resistance 726, linear resistance 729, and the upper and lower portions of winding 719. From the center tap of winding 719 the advance B current pulse may be traced through winding 830 of core 711 and back to the advance B pulse sources 735.

The relative values of the four elements of each Wheatstone bridge circuit are so chosen that the bridge is substantially balanced in the absence of an advance pulse A or B and in the presence only of that current which flows through each bridge circuit as a result of the application thereacross of that voltage which is induced across a transfer-loop winding, either output or input, when the core of such winding is switched from one state to the other. The bridge current resulting from such induced voltage is referred to in the claims as the reference current. When an advance pulse flows through a bridge circuit the non-linear resistances decrease considerably in ohmic value, thus unbalancing the bridge circuit. If a voltage is created across the terminals of an output winding 718, 719 or 720 when the associated bridge circuit is unbalanced, a difference of potential will be created across the input winding 715, 716 or 717 of the next adjacent core. As will be explained later, this difference can be sufficiently large to cause the magnetic flux in the said next adjacent core to switch from one polarity to the opposite polarity.

The operation of the circuit shown in FIG. 12 will now be described. Assume that a pulse has been applied to input winding 714 which causes core 710 to have a condition of positive remanence as indicated by the direction of the arrow 759 and which condition is herein arbitrarily designated to represent a binary bit of "1." Assume further that cores 711, 712 and 713 are in a condition of negative remanence as indicated by a direction opposite to the direction of the arrows 760, 761 and 762 and which condition is herein defined as representing binary bits of "0."

If now an advance A pulse is applied to conductor 740, the binary bit of "0" contained in core 712 will be transferred to core 713 and the binary bit of "1" contained in core 710 will be transferred to core 711. When the advance A pulse flows from the center tap of winding 717 through the bridge circuit to the center tap of winding 720, the non-linear resistances 724 and 727 in the bridge circuit decrease in value and the bridge circuit becomes unbalanced. Consequently, any difference of potential developed across the end terminals of winding 720 will cause a difference of of potential across the end terminals of winding 717. The advance A pulse continues to flow through winding 840 of core 712 and causes the core 712 to become negatively saturated. However, since the core 712 is already in a condition of negative remanence, the magnetic flux change occurring in core 712 is insufficient to cause a large enough induced voltage across the end terminals of winding 720 to cause any appreciable change of magnetic flux in core 713. Thus it can be seen that the binary bit of "0" contained in core 712 has been effectively transferred to core 713.

The advance A pulse flows through conductor 742 to the center tap of winding 715. When the advance A current pulse flows from the center tap of winding 715, through the bridge circuit, to the center tap of winding 718, the bridge circuit becomes unbalanced due to the fact that the resistance of non-linear resistors 722 and 725 decreases appreciably with the flow of the advance A pulse current therethrough. Consequently, if a difference of potential is created across the end terminals of winding 718, a difference of potential will appear across the end terminals of winding 715. Thus, when the advance A pulse current flows through winding 820 to cause the magnetic flux in core 710 to switch from a positive remanence condition to a negative saturation condition, a voltage will be induced in winding 718 of sufficient magnitude to cause a current flow through the winding 715 of core 711 which will be large enough to switch the magnetic flux in core 711 from a condition of negative remanence to a condition of positive saturation. Upon termination of the advance A pulse the magnetic flux in core 711 will relax to a condition of positive remanence which represents a binary bit of "1." Thus the binary bit of "1" stored in core 710 has been effectively transferred to the core 711 leaving the core 710 containing a binary bit of "0."

In a similar manner the subsequent application of an advance B pulse can be applied on conductor 741 to cause the information stored in cores 711 and 713 to be transferred to core 712 and to a load or utilization circuit 780 respectively.

Though not immediately apparent, the flow of the advance current in the coupling circuit which unbalances the bridge will have no effect on either core coupled together by the given coupling circuit. Consider the coupling circuit shown between cores 710 and 711 of FIG. 12. Assume that an advance pulse is applied on conductor 742. This advance pulse will flow to the center tap of winding 715 and then flow in parallel through the two portions of winding 715 toward the points 738 and 739 of the bridge circuit. Each of the currents flowing toward the points 738 and 739 from the winding 715 on core 711 has two paths presented to it. One is the high impedance path through resistor 731 or resistor 728 and the other is the low impedance path (when a current is passing therethrough) through non-linear resistor 722 or non-linear resistor 725. Each of these two currents is similarly affected by the presence of the winding 718 across points 736 and 737. Therefore, the currents flowing toward points 738 and 739 must be equal, and consequently the net effect of the advance current on core 711 is zero. Similarly, each of the currents flowing away from points 736 and 737 receives a contribution from two sources. One of these two sources is the high impedance source, resistors 728 and 731 and the other of the two sources is the low impedance source, non-linear resistance 722 and non-linear resistance 725. As a result, the currents flowing away from points 736 and 737 are equal. Therefore, the net effect of the advance current on core 710 is zero.

It is to be understood that examples of the invention herein shown and described are but preferred embodiments of the same and that various changes may be made in circuit arrangement, component values, sizes and materials without departing from the spirit or scope of the invention.

I claim:

1. A magnetic shift register comprising a plurality of magnetic cores arranged in a row, each of said cores exhibiting stable magnetic remanent states, a plurality of coupling circuits each individually coupling together adjacent ones of said plurality of magnetic cores, each of said coupling circuits comprising a tapped output winding on a transmitting magnetic core, a tapped input winding on the next succeeding receiving magnetic core in said row, a first asymmetrical conducting device associating a first end terminal of said tapped output winding with a first end terminal of said tapped input winding, a second asymmetrical conducting device associating the second end terminal of said tapped output winding with the second end terminal of said tapped input winding, said first and second asymmetrical constructing devices being directed to pass current more readily toward end terminals of the same winding, a plurality of advancing windings each individually wound on one of said magnetic cores, each of said advancing windings being connected to the tap of one of the windings of the next succeeding coupling circuit, and means to apply an electrical current pulse flow through the advance windings.

2. A magnetic shift register in accordance with claim 1 comprising a plurality of resistive means, individual ones of which are connected in series with individual ones of said first and second asymmetrical conducting devices.

3. A magnetic shift register in accordance with claim 1 in which said first tapped windings and said second tapped windings are center tapped windings.

4. A magnetic device comprising a plurality of magnetic cores arranged in a row, each of said cores exhibiting stable magnetic remanent states and a plurality of coupling circuits each individually coupling together adjacent ones of said plurality of magnetic cores, each of said coupling circuits comprising a first tapped output winding on a given magnetic core and a second tapped input winding on the next succeeding magnetic core in said row, a first asymmetrical conducting device and a second asymmetrical conducting device respectively associating first end terminals and second end terminals of said first and second tapped windings together in such a manner that the respective anodes of said first and second asymmetrical conducting devices are presented to end terminals of the same winding, a plurality of advance windings each individually wound on respective ones of said plurality of magnetic cores, each of said advance windings being connected to the one of the tapped windings of the next succeeding magnetic core, and means to apply an electrical current impulse simultaneously through alternate ones of the coupling circuits and their assocciated advance windings.

5. A magnetic device in accordance with claim 4 in which each of said first tapped output windings and each of said second tapped input windings is a center tapped winding.

6. A magnetic device in accordance with claim 4 comprising a second plurality of coupling circuits coupling together adjacent ones of said magnetic cores and each comprising a third tapped output winding on a given core in said row, a fourth tapped input winding on the immediately preceding magnetic core in said row, a third asymmetrical conducting device connecting a first end terminal of said third output winding to a first end terminal of said second input winding, and a fourth asymmetrical conducting device connecting the second end terminal of said third tapped output winding to the second end terminal of the said fourth tapped input winding, a further plurality of advancing windings each individually wound on one of said magnetic cores, said further advancing windings being connected to the tap of one of windings of the immediately preceding magnetic core in said row, and further means to apply current pulses simultaneously through alternate ones of said second plurality of coupling circuits and their associated advancing windings.

7. A reversible magnetic shift register comprising a plurality of magnetic cores arranged in a row, each of said cores exhibiting stable magnetic remanent states, a first plurality of coupling circuits each individually coupling together adjacent ones of said plurality of magnetic cores, each of said first plurality of coupling circuits comprising a tapped output winding on a given core in said row and a tapped input winding on the next succeeding magnetic core in said row, a first asymmetrical conducting device and a second asymmetrical conducting device respectively associating first end terminals and second end terminals of said output and input tapped windings together in such a manner that the respective anodes of said first and second asymmetrical conducting devices are presented to end terminals of one of said tapped windings, a plurality of advancing windings each individually wound on one of said plurality of magnetic cores, each of said advancing windings being connected to the tap of one of the tapped windings of the next succeeding magnetic core, first means to apply an electrical pulse on a terminal of said advancing winding wound on the first magnetic core in said row, and second means to apply an electrical pulse on a terminal of the advancing winding wound on the second magnetic core in said row, and a second plurality of coupling circuits coupling together adjacent ones of said magnetic cores, each of said second plurality of coupling circuits comprising a further tapped output winding on a given magnetic core and a further tapped input winding wound on the immediately preceding magnetic core in said row, a third asymmetrical conducting device and a fourth asymmetrical conducting device respectively coupling first and second end terminals of said further tapped output and input windings together in such a manner that the respective anodes of said third and fourth asymmetrical conducting devices are individually presented to the end terminals of one of the further tapped windings, a plurality of further advnacing winding means each individually wound on one of said magnetic cores, each of said further advancing windings being connected to the tap of one of the further tapped windings of the immediately preceding magnetic core, means to apply an electrical pulse on a terminal of the further advancing winding means of the last magnetic core in said row, and means to apply an electrical pulse on a terminal of the further advance winding means of the next to last magnetic core in said row.

8. A magnetic shift register comprising a plurality of magnetic elements, each exhibiting stable magnetic remanent states a plurality of coupling circuits arranged to individually couple together said magnetic elements in a row, each of said coupling circuits comprising a first tapped output winding on a given magnetic core, a second tapped input winding on the next adjacent magnetic core, a first asymmetrical conducting device connected between a first end terminal of said first tapped winding being connected to a first end terminal of said second tapped winding, a second asymmetrical conducting device connected between a second end terminal of said first tapped winding to a second end terminal of said second tapped winding, a plurality of third windings each individually wound on individual ones of said magnetic cores, first terminals of each of said third windings being individually connected to the tap of a tapped winding on one magnetic core, second terminals of each of said third windings being individually connected to the tap of a tapped winding on another magnetic core, and means to simultaneously pass current pulses through at least a portion of said third windings and the corresponding taps of said tapped windings.

9. A magnetic shift register in accordance with claim 8 in which said means to pass current comprises a first means and a second means, adapted to apply pulses simultaneously to the third winding on every even numbered magnetic core in said row and to the associated coupling circuits, and a second means adapted to apply pulse simultaneously to the third winding on every odd numbered magnetic core in said row and to the associated coupling circuits.

10. A magnetic device comprising a first magnetic core and a second magnetic core, each of said magnetic cores exhibiting stable magnetic remanent states and each having at least one output winding with an output winding on the first core being tapped, a further winding on each of the cores with at least the further winding on the first core having one of its terminals connected electrically to the tap of the tapped output winding on such core, an input winding on said first of said magnetic cores, a tapped input winding on the said second magnetic core, the end terminals of said tapped output winding of said first magnetic core being coupled with the end terminals of said tapped input winding of said second magnetic core, and means to selectively apply a conditioning current pulse to the tap of one of the output windings on the first core while separately energizing said further windings about said first core.

11. A magnetic shift register comprising a plurality of magnetic cores arranged in a row, each of said cores exhibiting stable magnetic remanent states; a plurality of coupling means each individually coupling together adjacent ones of said plurality of magnetic cores; each of said coupling means comprising a tapped output winding on a given magnetic core, a tapped input winding on the next succeeding magnetic core in said row, a transfer circuit coupling the input and output windings, asymmetrical conducting means in the transfer circuit connected to prevent current from circulating in the transfer circuit in response to potentials generated in said input and output windings, and means for passing current from an external source through the asymmetrical conducting means and the tap on said input and output windings to condition the transfer circuit for transfer of information when a change of remanence state is effected in said given magnetic core.

12. A magnetic device comprising a first and a second static magnetic storage core each exhibiting stable magnetic remanent states and each having at least one tapped winding, means for establishing a predetermined remanence condition in each core, means for selectively entering information in at least one core of a remanence condition opposite the predetermined condition, a circuit coupling the ends of a tapped winding upon each core, and means for passing current from the center taps through two parallel paths in said tapped windings to establish substantially opposing magnetic flux in each core during the static condition of the cores.

13. A device as defined in claim 12 wherein the coupling circuit includes asymmetrical conducting means for preventing circulating current flow in the coupling circuit in response to potentials induced in the tapped windings when a remanence condition is established in one of the cores.

14. A transfer loop for coupling two static magnetic storage elements each exhibiting stable remanent states, comprising in combination, an output winding on a first one of said elements and an input winding on the second one of said elements, at least one of said windings being tapped at an intermediate point along its length, a coupling circuit connected between said first and second windings for providing two branch paths in said transfer loop, one path including at least a portion of both of said windings and the other including at least a portion of said at least one tapped winding, means connected to the tap of said tapped winding for passing current flow from an external source through both of said branch paths when the elements are in a static condition, and means including said output winding for inhibiting current flow from said source in one of said branch paths in response to a dynamic flux switching operation in said first element.

15. A transfer loop as defined in claim 14 including means for selectively passing current flow through said branch paths to conditionally enable the loop to transfer information between said elements.

16. A transfer loop as defined in claim 15 wherein said tapped winding is for establishing a predetermined remanence condition in one of the elements.

17. A system for conditionally transferring information between two static magnetic elements each exhibiting stable magnetic remanent states comprising means for establishing opposing magnetic fluxes in at least one of said elements when the elements are in a static condition, and means for unbalancing the magnetic flux in said one element in such magnitude and direction in response to the change of the static remanence state in the other element that the information in said other element is transferred to said one element.

18. A system as defined in claim 17 wherein the means for establishing opposing magnetic flux comprises tapped windings on each element, and a coupling circuit linking the two tapped windings by a pair of asymmetrical conducting devices poled to prevent circulating current in the coupling circuit solely in response to potentials induced in either of said tapped windings.

19. A system as defined in claim 17 wherein the means for establishing opposing magnetic flux comprises a tapped winding on at least said one element, an external current source coupled to the tap of said winding, and means proportioning the current flow in the two sections of the tapped winding so that the opposing flux components are substantially equal in magnitude.

20. In combination, a pair of magnetic storage elements each exhibiting stable magnetic remanent states and a transfer loop connected therebetween including a tapped winding on one element connected by two leads to a pair of asymmetrical conductors connected in said two leads of the transfer loop to pass current in the same direction along both leads from one of the elements to the other element, means for passing enabling current through the asymmetrical conductors to the tap on said tapped windings to condition the loop for passing signals from one element to another, and means for biasing one of said asymmetrical conductors in a direction tending to inhibit the enabling current flow therethrough in response to the remanent state of one of said elements.

21. A loop as defined in claim 20 wherein the biasing means comprises a winding about one of said elements being connected in the enabling current flow path, and means causing a change of remanence condition in the last mentioned element in such a direction that the potential induced therefrom in said winding comprises the bias for said one asymmetrical conductor.

22. A reversible magnetic shift register comprising a plurality of permanent storage cores and a plurality of temporary storage cores, each of said cores having two stable storage states of magnetic remanence for storing binary information, one of which is a first or reference state and the other a second state, each of said cores further having a first input winding and a first output winding coupled to said core for transferring information from one core to the next in a first direction, each of said cores also having a second input winding and a second output winding for transferring information from one core to the next in a reverse direction, said permanent storage cores each having at least a single switching winding for establishing said reference state during first time periods and said temporary storage cores each having at least a single switching winding for establishing said reference state during second time periods, said first output winding of one of said permanent storage cores connected to said first input winding of one of said temporary storage cores so as to form a closed circuit transfer loop between said permanent and said temporary storage cores for transferring information pulses in said first direction, said second output winding of said temporary storage core connected to said second input winding of said permanent storage core so as to form a second closed circuit transfer loop between said permanent and said temporary storage cores for transferring information in said reverse direction, transfer source means connected to each of said transfer circuits at two separate points to form between said two points in each of said transfer circuits two parallel current paths for current from said transfer source means, one of said parallel paths including at least a portion of the output winding of the respective transfer circuit and the other including at least a portion of the input winding of said respective transfer circuit, means for selectively applying the current from said transfer source means to one of said transfer circuits to cause a transfer of information along said register in one direction or the other, means including the output winding in the selected transfer circuit for diverting transfer current flow through said selected transfer circuit away from the parallel path including said portion of the output winding and into the parallel path including said portion of the input winding to cause an unbalance of transfer current flow in the respective parallel paths of said transfer circuit and a resultant change of state of the core which includes the input winding of the selected transfer circuit only when the core which includes the output winding of that circuit is in its second storage state.

23. A reversible magnetic shift register comprising a plurality of storage cores arranged in succession, each having two stable storage states of magnetic remanence for storing binary information, one of which is a first or reference state and the other a second state, each of said cores further having a first input winding and a first output winding coupled to said core for transferring information from one core to the next in a first direction, each of said cores also having a second input winding and a second output winding for transferring information from one core to the next in a reverse direction, said first output winding of each of said storage cores connected to said first input winding of the following storage cores in said succession so as to form closed circuit transfer loops between successive storage cores for transferring information pulses in said first direction, said second output winding of each of said storage cores connected to said second input winding of the preceding storage core in said succession so as to form second closed circuit transfer loops between successive storage cores for transferring information in said reverse direction, transfer source means connected to each of said transfer circuits at two separate points to form between said two points in each of said transfer circuits two parallel current paths for current from said transfer source means, one of said parallel paths including at least a portion of the output winding of the respective transfer circuit and the other including at least a portion of the input winding of said respective transfer circuit, means for selectively applying the current from said transfer source means to one of said transfer circuits to cause a transfer of information along said register in one direction or the other, means including the output winding in the selected transfer circuit for diverting transfer current flow through said selected transfer circuit away from the parallel path including said portion of the output winding and into the parallel path including said portion of the input winding to cause an unbalance of transfer current flow in the respective parallel paths of said transfer circuit and a resultant change of state of the core which includes the input winding of the selected transfer circuit only when the core which includes the output winding of that circuit is in its second storage state.

24. A transfer loop having two parallel branch paths coupling two magnetic storage elements each having transformer windings thereon, said elements having a substantially rectangular hysteresis loop characteristic, means for providing current flow in both paths of said loop, and winding means for producing a flux change in one of said elements to selectively inhibit the current flow in one of said paths of said loop in response to signals thereby generated in one of said transformer windings.

25. A transfer loop connecting two magnetic storage binary elements wherein each element has a substantially rectangular hysteresis loop characteristic, said transfer loop comprising two branch paths of current flow, an output winding associated with one of said storage elements and an input winding associated with said other element, both windings being in said transfer loop, at least one asymmetrical conductor coupled in said transfer loop, an external current source for passing current through said two branch paths and through said input winding to create substantially equal and opposite magnetic flux in said other element, and means including said output winding for selectively biasing said asymmetrical conductor to inhibit flow of current from said external source in one of said current paths in response to the dynamic switching of said one of said elements from one of its binary states to the other, resulting in an unbalance of flux in said other element of enough magnitude to cause said other element to switch from one binary state to another.

26. Means for transferring information from one magnetic storage binary element having a substantially square hysteresis loop characteristic to another similar element comprising in combination, an output winding associated with one element and an input winding associated with the other element, a transfer loop coupling said windings, said transfer loop including two branch current paths, an external current source for passing current through said two paths and through said input winding to create substantially equal and opposite magnetic flux in said other element, a diode coupled in the transfer loop, means including said output winding for selectively biasing said diode to inhibit current flow in one of said paths, and means for effecting transfer of information between said elements in response to inhibited current flow through the diode, said inhibited current flow resulting in an unbalance of said equal and opposite flux of enough magnitude to cause said other element to switch from one binary state to another.

27. A magnetic device comprising at least first and second saturable core elements, each exhibiting stable magnetic remanent states, a current path having two sections in parallel, the first section including a first winding on the first element, the second section including a winding on the second element, means for applying a voltage drop across said path to cause current to flow therein, the said first winding on the first element being arranged to generate during shift of the first element a voltage which is in opposition to current flow in said first section, means including a transfer winding on the first element for carrying a transfer current coexisting in time with the first mentioned current, the arrangement being such that transfer current in said transfer winding in amount sufficient to but in a direction against shift of the first element will cause the current in said path to divide due to low induced back voltage in the first winding of the first element between said two sections with insufficient current in the second section to shift the second element, and transfer current in amount sufficient to and in a direction to shift the first element will cause the current in the path to divide due to higher back voltage induced in said first winding of said first element between said two sections with sufficient current in the second path to shift the second element.

28. A device as in claim 27 wherein the transfer winding on the first element is connected in the current path beyond the sections thereof.

29. A device as in claim 27 wherein each section of the current path includes a unidirectional conducting device connected to conduct in the same direction in the respective sections to prevent loop currents in the respective windings during operation of the device.

30. An electrical circuit comprising a magnetic core exhibiting stable magnetic remanent states having a plurality of windings thereon, said windings including an input winding, an output winding, and an advance winding, first unidirectional current means connected in series with said output winding, load means, second unidirectional current means connected in series with said load means, said load means and second unidirectional means being connected in parallel across said output winding and said first unidirectional current means, and means connecting said advance winding to said paralleled output winding and load means.

31. An electrical circuit comprising a magnetic core exhibiting stable magnetic remanent states having a plurality of windings thereon, said windings including an input, an output, and an advance winding, a first unidirectional current element connnected in series with said output winding, load means, a second unidirectional current element connected in series with said load means, said load means and said second unidirectional current element being connected in shunt across said output winding and said first unidirectional current element, and means for and applying a pulse to said output winding and for simultaneously applying a pulse to said advance winding for switching the direction of magnetization of said core.

32. A magnetic shift register comprising a first plurality of magnetic cores, a second plurality of magnetic cores, said first and second plurality of magnetic cores being arranged alternately in an electrical row and each capable of assuming either of two stable states of magnetic remanence, a first tapped winding on each of said magnetic cores other than said first magnetic core in said row, a second winding on each of said cores, first terminals of each of said second windings being connected to first end terminals of the tapped windings of the magnetic cores next succeeding in said electrical row, a plurality of first circuit means each comprising a first asymmetrically conducting device having first and second electrodes and a first resistive means connected in series with said electrodes, a first one of said electrodes of each of said first asymmetrically conducting devices being connected to an individual one of the second terminals of said second windings, a plurality of second circuit means each comprising a second asymmetrically conductive device having two electrodes and a second resistive means coupled in series with the electrodes, a first one of said electrodes of each of said second asymmetrically conductive devices being connected to an individual one of the second end terminals of said first windings, a plurality of common junction points, one each of said common junction points joining together the circuit including said second resistive means associated with a given one of said plurality of first windings with the circuit including said first resistive means associated with the one of said second windings of the next preceding one of said plurality of magnetic cores, all except the first and second of said junction points in said row of cores being connected to the tap of the said first winding associated with the magnetic core immediately preceding the magnetic cores associated with said junction point, a first means adapted to apply an electrical pulse to the tap of the first winding associated with the last magnetic core in said electrical row, and a second means adapted to apply an electrical pulse to the tap of the first winding associated with the next to last magnetic core in said electrical row.

33. A magnetic shift register comprising a first plurality of magnetic cores, a second plurality of magnetic cores, said first and second pluralities of magnetic cores being individually arranged in alternate manner in an electrical row and each of said cores being capable of assuming either of two stable states of magnetic remanence, a plurality of coupling circuits, one each of said coupling circuits joining together adjacent ones of said magnetic cores, each of said coupling circuits comprising a first winding on a given one of said magnetic cores, a second tapped winding on the next adjacent magnetic core, first circuit means connecting a first terminal of said first winding and a first end terminal of said second tapped winding, and second circuit means connecting the second terminal of said first winding and the second end terminal of said second tapped winding, said first circuit means comprising a first asymmetrically conducting device having an anode and a cathode, a second asymmetrically conducting device having an anode and a cathode, a first resistance, and a second resistance all connected in a series arrangement such that the anode of said first asymmetrical device is connected to the said second terminal of said first winding and the anode of the said second asymmetrical device is connected to the second end terminal of said second tapped winding, the junction between each of said first and second resistive means being connected to the tap of the said second winding of the magnetic core immediately preceding the two magnetic cores coupled together by the circuit means comprising the specific first and second resistive means, a first means to apply an electrical pulse to the center tap of the second winding on the last magnetic core in said row, and second means to apply an electrical pulse to the tap of the second winding on the next to last magnetic core in said row of magnetic cores.

34. A magnetic shift register comprising a plurality of magnetic cores arranged in an electrical row, each of said cores being capable of assuming either of two stable states of magnetic remanence, a first plurality of coupling circuits adapted to couple together adjacent ones of said plurality of magnetic cores, each of said coupling circuits comprising a first winding means wound on a given individual one of said magnetic cores and a second tapped winding wound on the magnetic core next succeeding said given magnetic core in said row of magnetic cores, a first terminal of said first winding means being connected to a first end terminal of said second winding means, a circuit means comprising a first asymmetrically conducting device having first and second electrodes, a second asymmetrically conductive device having first and second electrodes, a first resistive means, and a second resistive means all connected in a series arrangement such that the first electrode of said first asymmetrical means is connected to the second terminal of said first winding means and the first electrode of said second asymmetrical means is connected to a second end terminal of said second tapped winding, a junction point between said series arrangement circuits, a plurality of connecting means individually connecting each of the said junctions to individual ones of the taps of the said second winding associated with the magnetic core immediately preceding the two magnetic cores coupled together by the coupling means comprising said junction points, a first means to apply an electrical pulse to the tap of the said second winding of the last magnetic core in said row, and second means to apply an electrical pulse to the tap of the said second winding of the next to last magnetic core in said row of magnetic cores.

35. A magnetic shift register in accordance with claim 34 comprising a second plurality of coupling circuits adapted to couple together adjacent ones of said magnetic cores, each of said second plurality of coupling circuits comprising the same arrangement of circuit elements as said first plurality of circuit elements, each of said second plurality of elements being connected in reverse order to that of said first plurality of coupling circuits, a third means to cause the information signals represented by the magnetic storage states of the odd numbered cores to be advanced to the even numbered cores in said row of cores, and fourth means to cause the information signals represented by the magnetic storage states of the even numbered cores to be advanced to the odd numbered cores in said row of cores.

36. A reversible magnetic shift register comprising a plurality of magnetic cores arranged in an electrical row, each of said cores being capable of assuming either of two stable states of magnetic remanence, a plurality of coupling circuits, each of said magnetic cores being coupled to each adjacent magnetic core by two of said coupling circuits, a first of said two coupling circuits comprising a first winding means wound on a given individual one of said magnetic cores and a second tapped winding means wound on next succeeding one of said magnetic cores, a second of said two coupling circuits comprising a second tapped winding means wound on said given magnetic core and a second winding means wound on said next preceding magnetic core, first terminals of said first and second winding means being connected to first end terminals of said first tapped winding and said second tapped winding respectively, a plurality of circuit means, individual ones of said plurality of circuit means connecting the second terminals of each of said first and second windings to the second end terminals of the associated first tapped winding and second tapped winding respectively, each of said circuit means comprising a first asymmetrically conducting device having an anode and a cathode, a second asymmetrically conducting device having an anode and a cathode, a first resistance, and a second resistance connected in series arrangement in such a manner that the anode of said first asymmetrical device is connected to the said second terminal of the associated winding means and the anode of said second asymmetrical device is connected to the said second end terminal of the associated tapped winding means, a junction between the said first and second resistive means of each of said plurality of circuit means, the junctions associated with the coupling circuits comprising the associated first winding and the associated first tapped windings being connected to the tap of the first tapped winding associated with the magnetic core immediately preceding the two magnetic cores coupled together by the coupling circuit comprising the associated junction, the junctions associated with the coupling circuits comprising second windings and second tapped windings being connected to the tap of the second tapped winding associated with the magnetic core immediately following the two magnetic cores coupled together by the coupling circuit comprising the associated junction, a third means adapted to apply electrical pulses upon the tap of the first tapped winding of the last magnetic core in said row, a fourth means adapted to apply electrical impulses upon the tap of the first tapped winding of the next to last magnetic core in said row, a fifth means adapted to apply electrical pulses to the tap of the second tapped winding of the first magnetic core in said row, and a sixth means adapted to apply electrical pulses to the tap of the second tapped winding of the second magnetic core in said row.

37. A reversible magnetic shift register comprising a plurality of magnetic cores arranged in a row, each core being capable of assuming either of two stable states of magnetic remanence, a first plurality of coupling circuits coupling adjacent ones of said plurality of magnetic cores together, a second plurality of coupling circuits coupling adjacent ones of said plurality of magnetic cores together, each of said first plurality of coupling circuits comprising a first winding means wound on a given magnetic core and a first tapped winding wound on the next succeeding magnetic core, a first terminal of said first winding means being connected to a first end terminal of said first tapped winding, and a first circuit means connecting the second terminal of said first winding means to the second end terminal of said first tapped winding, each of said second plurality of coupling circuits comprising a second winding means wound on a given magnetic core and a second tapped winding means wound on the immediately preceding magnetic core, a first terminal of said second winding means being connected to a first end terminal of said second tapped winding, a second circuit means connecting the second terminal of said second winding means to the second end terminal of said second tapped winding, said first and second circuit means each comprising a first asymmetrically conductive device, having an anode and a cathode, a second asymmetrically conductive device having an anode and a cathode, a first resistive means, and a second resistive means connected in a series arrangement such that the anode of said first asymmetrical device is connected to the second terminal of the associated winding means and anode of said second asymmetrical device is connected to the second end terminal of the associated tapped winding, a junction between each of said first resistive means and said second resistive means, each of the junctions associated with said first plurality of coupling means being individually connected to the tap of the said second winding means immediately preceding the two magnetic cores coupled together by the coupling means comprising the associated junction, each of the junctions associated with said second plurality of coupling means being individually connected to the tap of the said second winding means of said second plurality of winding means of the magnetic core immediately succeeding the two magnetic cores coupled together by the coupling means comprising the associated junction, and first means adapted to selectively impress electrical impulses upon the taps of the second tapped windings of said last magnetic core in said row and said next to last magnetic core in said row and second means adapted to selectively impress electrical impulses upon the taps of the tapped windings of said first magnetic core in said row and said second magnetic core in said row.

38. A magnetic shift register comprising a plurality of magnetic cores arranged in a row, each of said cores being capable of assuming either of two stable states of magnetic remanence, a plurality of coupling circuits each individually coupling together adjacent ones of said magnetic cores, each of said coupling circuits comprising a first winding on a given one of said magnetic cores, a second tapped winding on the next adjacent magnetic core, a first terminal of said first winding being connected to a first end terminal of said second tapped winding, and a first circuit means connecting the second terminal of said first winding to the second end terminal of said second tapped winding, said circuit means comprising a junction point, a first asymmetrically conductive device, and a second asymmetrically conductive device having an anode and a cathode, said first asymmetrical device connecting said junction point to said second terminal of said first winding, said second asymmetrical device connecting the said junction point to the said second terminal of said second tapped winding, the polarities of said first and second asymmetrical devices being arranged so that similar impedances are presented to said junction point, each of said junctions being connected to the tap of the said second winding of the magnetic core immediately preceding the two magnetic cores coupled together by the circuit means comprising the associated junction, a first means to apply an electrical pulse to the center tap of the second tapped winding on the last magnetic core in said row, and second means to apply an electrical pulse to the tap of the second tapped winding on the next to last magnetic core in said row of magnetic cores.

39. A reversible magnetic shift register comprising a plurality of magnetic cores arranged in a row, each of said cores being capable of assuming either of two stable states of magnetic remanence, a first plurality of coupling circuits and a second plurality of coupling circuits, one of said first plurality of coupling circuits and one of said second plurality of coupling circuits coupling together successive ones of said magnetic cores, each of said coupling circuits comprising a first winding on a given one of said magnetic cores, a second tapped winding on an adjacent one of said magnetic cores, a first terminal of said first winding being connected to a first end terminal of said second tapped winding, and a first circuit connecting the second terminal of said first winding to the second end terminal of said second tapped winding, said circuit means comprising a first asymmetrically conductive device having an anode and a cathode, a second asymmetrically conductive device having an anode and a cathode, and a junction point, said first asymmetrical device connecting said junction point to said second terminal of said first winding, and said second asymmetrical device connecting said junction point to the said second end terminal of said second tapped winding, the said adjacent magnetic core with respect to the said first plurality of coupling circuits being the next succeeding magnetic core in said row, the said adjacent magnetic core with respect to said second plurality of coupling circuits being the immediately preceding magnetic core in said row, each of said junctions of said first plurality of coupling circuits being connected to the tap of the said second tapped winding of the magnetic core immediately preceding the two magnetic cores coupled together by the coupling circuit comprising the associated junction point, each of the junctions of said second plurality of coupling circuits being connected to the tap of the said second tapped winding of the magnetic core immediately succeeding the two magnetic cores coupled together by the coupling circuit comprising the associated junction point, and means to selectively apply electrical pulses to the taps of said second tapped windings.

40. A reversible magnetic shift register comprising a row of magnetic cores, each of said cores being capable of assuming either of two stable states of magnetic remanence, a first plurality of coupling means, each of said first plurality of coupling means comprising a first output winding on a given core in said row of cores and a first split input winding on the next subsequent magnetic core, a first means to advance in a first direction the information signals represented by the magnetic storage states of the odd numbered cores to the even numbered cores in said row of magnetic cores, a second means to advance in said first direction the information signals represented by the magnetic storage states of the even numbered cores to the odd numbered cores, a second plurality of coupling means, each of said second plurality of coupling means comprising a second output winding on a given magnetic core and a second split input winding on the next preceding magnetic core, a third means to advance in the direction reversed to that of said first direction the information signals represented by the magnetic storage states of said odd numbered cores to said even numbered cores, and a fourth means to advance in the direction reverse to that of said first direction the information signals represented by the magnetic storage states of said even numbered cores to said odd numbered cores.

41. A magnetic shift register comprising an array of binary magnetic elements, each of said elements being capable of assuming either of two stable states of magnetic remanence, a transfer loop coupling each pair of such immediately adjacent elements comprising an untapped output winding on the first element of the pair and a tapped input winding on the second element of said pair, the terminals of said output winding joined to end terminals of said tapped input winding, a pair of asymmetrically conducting devices connected in said transfer loop to each second terminal of said input and oriented in a direction to current flow inhibit circulating and means to pass advancing current through said transfer loop, the tap of the input winding and a junction point intermediate said asymmetrically conducting devices being the points of entry and exit for the advancing current through said transfer loop.

42. A magnetic signal transfer loop comprising two bistable magnetic switching elements, each of said elements being capable of assuming either of two stable states of magnetic remanence, output winding on a first of said elements, a pair of input windings on a second of said elements, a pair of diodes coupling the input windings with the output winding to pass current in the transfer loop coupling circuit from one element to the other, a circuit connection between said input windings, means for passing current into said connection to thereby pass current into two branch current paths each including one of said input windings and one including at least a portion of said output winding for causing substantially balanced magnetic flux in said input windings in the static condition of said elements and for causing enough flux unbalance in the second said element upon a dynamic switching of the first element in one direction to cause the second element to switch from one stable position to the other.

43. The invention claimed in claim 42 wherein the diodes are coupled in a single lead connecting a terminal of said output winding to a terminal of one of said input windings.

44. First and second magnetic cores each capable of assuming either of two stable states of magnetic remanence, one of said states being considered a reference state; an input winding on said first core which when energized by a pulse of current switches or tends to switch said first core to the state other than said reference state; an output winding on said first core in which a voltage is induced when said first core switches from either of said states to the other; a transfer loop coupling said first and second cores, said transfer loop including said first-core output winding, an input winding on said second core, and a pair of asymmetrically current conducting devices, said second-core input winding having a tap at an intermediate point, said asymmetrically current conducting devices being connected in opposing manner in said transfer loop to inhibit current flow around said loop and thereby prevent the said induced voltage in said first-core output winding from driving sufficient current around said loop and through the second-core input winding to effect switching of said second core; and shift means for controlling the state of said second core according to the state of said first core, said shift means comprising a source of shift pulse current, means for connecting one terminal of said source to said tap point on said second-core input winding and the other terminal of said source to a point on said transfer loop located between said asymmetrically current conducting devices, thereby to drive shift currents through two branch paths, one of which paths includes one tapped portion of said second-core input winding, said first-core output winding and one of said current conducting devices and the other of which paths includes the other tapped portion of said second-core input winding and the other of said current conducting devices, said shift current through said first-core output winding being in a direction to switch or to tend to switch said first core to said reference state, whereby when said first core is already in said reference state at the time said shift pulse is applied said output winding offers relatively low impedance to the flow of said shift current therethrough, the circuit parameters being such that under these conditions the shift currents through the two tapped portions of the second-core input winding establish flux in said core of substantially equal magnitude and opposing polarities, whereby said shift currents are ineffective to switch said second core, but whereby, when said first core is in the state other than said reference state at the time said shift pulse is applied, said first-core switches toward said reference state and said output winding offers relatively high impedance to the flow of shift current therethrough, whereby the shift currents through the two portions of said second-core tapped input winding create opposing flux of substantially different values and a net flux is established of sufficient magnitude to switch said second core.

45. In combination: first and second magnetic elements each capable of assuming either of two stable states of magnetic remanence, one of said states being considered a reference state; means for switching or tending to switch said first element to the state other than said reference state; output means coupled to said first element in which a voltage is induced when said first element switches; a transfer loop coupling said first and second elements, said transfer loop including said first-element output means, input means coupled to said second element having a tap at an intermediate point, and inhibit means to prevent the said induced voltage in said first-element output means from driving current around said loop and through said second-element input means; and shift means for controlling the state of said second element according to the state of said first element, said shift means comprising a source of shift pulse current, means for connecting one terminal of said source to said tap point on said second-element input means and the other terminal of said source to a point on said transfer loop such that two shift-current paths are established, one of which paths includes one tapped portion of said second element input means and said first-element output means and the other of which paths includes the other tapped portion of said second-element input means, said shift current through the branch which includes the first-element output means being a direction to switch or to tend to switch said first element to said reference state, whereby when said first element is already in said reference state during the flow of said shift current pulse said output means offers relatively low impedance to the flow of shift current therethrough, the impedances of the two branch paths being such that under these conditions the shift currents through the two tapped portions of the second-element input means establish flux in said second element of substantially equal magnitude and opposing polarities whereby said shift currents are ineffective to switch said second element, but whereby, when said first element is shifting from one state to the other during the flow of said shift current pulse applied, said first element switches toward said reference state said output means offers relatively high impedance to the flow of shift current therethrough, whereby the shift currents through the two tapped portions of the second-element input means create opposing flux of substantially different values and a net flux is established of sufficient magnitude to switch said second element.

46. A magnetic shift register comprising a plurality of magnetic cores arranged in a row, each of said cores exhibiting stable magnetic remanent states a plurality of coupling circuits coupling together adjacent ones of said magnetic cores, each of said coupling circuits comprising a tapped output winding on a given magnetic core, a tapped input winding on the next adjacent magnetic core, a bridge circuit comprising a first, second, third, and fourth terminal, the first and second end terminal of said output winding being connected to the first and third terminals respectively of said bridge circuit, the first and second end terminals of said input winding being connected respectively to the second and fourth terminals of said bridge circuit, a first resistance, a second resistance, a third resistance, and a fourth resistance being connected respectively between said first and second terminal, said second and third terminal, said third and fourth terminal, and said fourth and first terminal, respectively, of said bridge circuit, said first and third resistances being of the type whose resistance changes with electric current passage therethrough, and a plurality of third windings each individual to one of said magnetic cores, individual ones of said third windings being connected to the tap of one of the windings of the next succeeding coupling circuit same magnetic core and the second terminal of individual ones of said third windings being connected to the tap of the input winding of the immediately preceding magnetic core.

47. A magnetic shift register in accordance with claim 46 in which said first resistance, said second resistance, said third resistance, and said fourth resistance have substantially equal ohmic values when a reference current is flowing therethrough.

48. A magnetic shift register in accordance with claim 46 comprising a first energizing means adapted to apply electrical pulses to the third windings of alternate magnetic cores in said row, and a second energizing means adapted to apply electrical pulses to the third windings of the other alternate magnetic cores in said row.

49. A magnetic shift register in accordance with claim 46 in which said first resistance, said second resistance, said third resistance, and said fourth resistance have substantially equal ohmic values when a reference current is flowing therethrough, and comprising a first energizing means adapted to apply electrical pulses to the third windings of alternate magnetic cores in said row, and a second energizing means adapted to apply electrical pulses to the third windings of the other alternate magnetic cores in said row.

50. A magnetic shift register comprising a plurality of magnetic cores arranged in a row, each of said cores exhibiting stable magnetic remanent states a plurality of coupling circuits coupling together adjacent one of said magnetic cores, each of said coupling circuits comprising a first tapped output winding on a given magnetic core, a second tapped input winding on the next adjacent magnetic core, a first resistance and a second resistance connecting a first end terminal of said first tapped output winding to the first end terminal and the second end terminal respectively of said second tapped input winding, and a third resistance and a fourth resistance connecting the second end terminal of said first tapped output winding to the first end terminal and the second end terminal respectively of said second tapped input winding, said first and fourth resistances having characteristics whereby the value of resistance decreases when an electric current flows therethrough, and a plurality of third windings each individual to one of said magnetic cores, individual ones of said third windings being connected to the tap of one of said tapped windings of the next succeeding coupling circuit.

51. A magnetic shift register in accordance with claim 50 in which said first resistance, said second resistance, said third resistance, and said fourth resistance have substantially equal ohmic values when a reference current is flowing therethrough.

52. A magnetic shift register in accordance with claim 50 comprising a first energizing source adapted to apply electrical pulses to the third windings of alternate magnetic cores in said row and a second energizing source adapted ot apply electrical pulses to the third windings of the other alternate magnetic cores in said row.

53. A magnetic shift register in accordance with claim 50 in which said first resistance, said second resistance, said third resistance, and said fourth resistance have substantially equal ohmic values when a reference current is flowing therethrough, and comprising a first energizing source adapted to apply electrical pulses to the third windings of alternate magnetic cores in said row, and a second energizing source adapted to apply electrical pulses to the third windings of the other alternate magnetic cores in said row.

54. A magnetic shift register comprising a plurality of magnetic cores arranged in a row, each of said cores exhibiting stable magnetic remanent states, a plurality of coupling circuits adapted to couple together adjacent ones of said magnetic cores, each of said coupling circuits comprising a tapped output winding on a given magnetic core, a tapped input winding on the next adjacent magnetic core, and a Wheatstone bridge circuit comprising four terminals and four impedances, the end terminals, of said tapped output winding being connected to a first pair of opposite terminals of said bridge circuit, the two end terminals of said tapped input winding being connected to a second pair of opposite terminals of said bridge circuit, and two opposite impedances of said four impedances consisting of non-linear resistances, a plurality of third windings individually wound on each of said plurality of magnetic cores, each of said third windings being connected to one of said tapped windings of the next succeeding coupling circuit, a first input pulse source means adapted to apply input pulses to the third windings of alternate magnetic cores in said row, and a second input pulse source means adapted to apply input pulses to the third windings of the other alternate magnetic cores in said row.

55. A magnetic shift register in accordance with claim 54 in which said four impedances of said bridge circuit have substantially equal ohmic values when a reference current is flowing therethrough.

56. A magnetic device comprising a first magnetic core and a second magnetic core, each of said cores exhibiting stable magnetic remanent states, a first means to cause said first magnetic core to assume a preselected condition of magnetic flux remanence, a first tapped output winding on said first magnetic core, a second tapped input winding on said second magnetic core, a Wheatstone bridge circuit comprising four terminals and four impedances, the end terminals of said first tapped output winding being connected to a first pair of opposite ones of said terminals of said bridge circuit, the end terminals of said second tapped input winding being connected to the second opposite pair of terminals of said bridge circuit, a pair of oppositely positioned impedances in said bridge circuit consisting of non-linear resistors whose ohmic value changes appreciably when an electric current flows therethrough, and an energizing source connected for driving current between the tap of said first tapped output winding and the tap of said second tapped input winding.

57. A magnetic device in accordance with claim 56 in which said four impedances of said bridge circuit have substantially equal impedances when a reference current is flowing therethrough.

58. A magnetic device comprising a first magnetic core and a second magnetic core, each of said cores exhibiting stable magnetic remanent states, a first means adapted to cause said first magnetic core to assume a preselected condition of magnetic remanence, a first tapped output winding on said first magnetic core, a second tapped input winding on said second magnetic core, a first impedance, a second impedance, a third impedance, and a fourth impedance, a first end terminal of said first tapped output winding being connected to the first end terminal and the second end terminal of said second tapped input winding by said first impedance and said second impedance respectively, said second end terminal of said first tapped output winding being connected by said third impedance and said fourth impedance to said first end terminal and said second end terminal of said second tapped input winding respectively, said first and fourth impedances being of a non-linear type whose ohmic value changes when an electric current flows therethrough, and an energizing source connected for driving current between the tap of said first tapped output winding and the tap of said second tapped input winding.

59. A magnetic device in accordance with claim 58 in which said first impedance, said second impedance, said third impedance, and said fourth impedance each have substantially equal ohmic values when a reference current is flowing therethrough.

60. In a magnetic shift register including a plurality of magnetic cores each exhibiting stable magnetic remanent stages, and a plurality of transfer circuits coupling adjacent ones of the cores together, each of said transfer circuits comprising a tapped output winding on a given magnetic core, a tapped input winding on the next adjacent magnetic core, and a Wheatstone bridge circuit comprising four terminals and four impedances, the end terminals of the tapped output winding being connected to a first pair of opposite terminals of said bridge circuit, the two end terminals of the tapped input winding being connected to a second pair of opposite terminals of the bridge circuit, two opposite impedances of said four impedances consisting of linear resistances, and the two remaining opposite impedances of said four impedances consisting of non-linear resistances.

61. A magnetic device comprising a first magnetic core and a second magnetic core, each of said cores exhibiting stable magnetic remanent states, means to cause said first magnetic core to assume a preselected condition of magnetic flux remanence, an output winding on said first magnetic core having an intermediate tap, an input winding on said second magnetic core having an intermediate tap, a Wheatstone bridge circuit romprising four terminals and four impedances, the end terminals of said output winding being connected to a first pair of opposite ones of said terminals of said bridge circuit, the end terminals of said input winding being connected to the second opposite pair of terminals of said bridge circuit, one pair of oppositely positioned impedances in said bridge circuit consisting of linear resistors whose ohmic value remains substantially constant when an electric current flows therethrough, the remaining pair of oppositely positioned impedances in said bridge circuit consisting of non-linear resistors whose ohmic value changes appreciably when an electric current flows therethrough, and an energizing source connected for driving current between the tap of said output winding and the tap of said input winding.

62. In combination: first and second magnetic cores each capable of assuming either of two stable states of magnetic remanence; means for applying energy to said first core to switch said core from one of its stable states to its other state; an output winding on said first core in which a voltage is induced when said first core is switched; an input winding on said second core; a transfer loop interconnecting said first-core output winding and said second-core input winding, said transfer loop comprising: an impedance bridge having four terminals and four impedances interconnecting said terminals, connections from the ends of said first-core output winding to opposite terminals of said bridge, and connections from the ends of said second-core input windings to the other opposite terminals of said bridge, one pair of opposite impedances of said bridge being of a type whose impedance varies as a function of the amount of current flowing therethrough and the other pair of opposite impedances of said bridge being of a type whose impedance is substantially constant for widely different values of current flowing therethrough; a center-tap on said first-core output winding; a center-tap on said second-core input winding; a source of switching current connected to pass current between said center-taps through the tapped portions of said input and output windings and through said impedance bridge, said four bridge impedances being chosen of such relative values that, in the absence of said switching current, the said bridge is substantially balanced, whereby, in the absence of said switching current, substantially no energy is transferred from one core to the other in response to the switching of said one core, said switching current being effective to unbalance said bridge sufficiently to cause switching of said second core in response to the switching of said first core.

63. In combination: first and second magnetic cores each capable of assuming either of two stable states of magnetic remanence; an output winding on said first core in which a voltage is induced when said first core is switched from one state to the other; an input winding on said second core, said input winding having a tap at a point intermediate to its two ends; means interconnecting the ends of said first-core output winding with the ends of said second-core input winding; a source of switching current connected to pass current through said first-core output winding, through said interconnecting means and through said second-core input winding, said interconnecting means including means to inhibit transfer of energy from one of said cores to the other in the absence of said switching current, response to said interconnecting means providing at least two branch paths for passing said switching current in parallel between said output and input windings and in opposing directions through the two tapped portions of said input winding to develop substantially equal and opposing flux in said tapped portions; and means for switching said first core from one stable state to the other when said switching current is flowing, thereby to add to and increase the total current flowing in one tapped portion of said second-core input winding, and to oppose and decrease the total current flowing in the other tapped portion of said input winding, thereby to develop sufficient net flux in said input winding to switch said second core.

64. Apparatus as claimed in claim 63 characterized in that said interconnecting means comprises an impedance bridge which is balanced in the presence of a reference current only, and which is unbalanced in the presence of both said switching current and said reference current.

65. In combination: first and second magnetic cores each capable of assuming either of two stable states of magnetic remanence; an output winding on said first core in which a voltage is induced when said first core changes its magnetic state; a tapped input winding on said second core; means for connecting the ends of said first-core output winding to the ends of said second-core input winding; a source of switching current; means for connecting said switching current source to pass current through said second-core input winding in opposing directions in the two tapped portions of said input winding to establish opposing flux of substantially equal magnitude whereby, in the absence of a change in the magnetic state of said first core, said switching current establishes a balanced flux condition in the input winding of said second core; and means for changing the magnetic state of said first core, the voltage induced in said first-core output winding, when said first core changes its magnetic state, being effective in the presence of said switching current to alter said balanced flux condition of said second core sufficiently to switch said second core.

66. Apparatus as claimed in claim 65 characterized in that said means for changing the magnetic state of said first core comprises an additional winding on said first core connected electrically to the top of said tapped input winding and said switching current source, and through which said switching current passes.

67. In a shift register, a pair of magnetic cores each capable of assuming either of two stable states of magnetic remanence one of which is a reference state, one of said cores having a switching winding coupled thereto and both of said cores having at least a transfer winding coupled thereto, each of said transfer windings having a tap at substantially the midpoint thereof; a first asymmetricallly conducting device connecting one end of the transfer winding of one core of the pair to one end of the transfer winding of the other core of the pair; a second asymmetrically conducting device connecting the other end of the transfer winding of said one core to the other end of the transfer winding of said other core, thereby to form two parallel paths between said cores which in combination with said transfer windings form a transfer loop, said first and second asymmetrically conducting devices being opposingly poled to prevent current flow around said loop; means connected between the tap points of said transfer windings of said pair of cores for driving transfer currents through said parallel paths in the same direction, the circuit parameters being such that in the absence of bias applied to said asymmetrically conducting devices the transfer currents in said parallel paths are substantially equal thereby to apply substantially equal and opposing magnetizing forces to each of said cores; means for driving switching current through said switching winding of said one of said cores to switch or to tend to switch said one core to said reference state, whereby in response to the actual switching of said one core a voltage is induced in its transfer winding to apply a reverse bias to one of said asymmetrically conducting devices and a forward bias to the other, whereby the transfer currents flowing through said parallel paths are caused to be unequal, thereby to apply a net magnetizing force to said other core of sufficient magnitude to switch said other core, whereby the switching of said other core in response to the switching of said one core is effected but only in the presence of said transfer current.

68. A shift register comprising a plurality of magnetic cores each capable of assuming either of two stable states of magnetic remanence one of which represents a binary "0" and the other of which represents a binary "1," each of said cores having a switching winding and at least one transfer winding coupled thereto, the transfer winding of each core having a tap at an intermediate point whereby to divide said transfer winding into an upper section and a lower section; means, including a first asymmetrically conducting device, connecting the end of the upper section of a transfer winding of each core to the end of the upper section of a transfer winding of the adjacent core; means including a second asymmetrically conducting device connecting the end of the lower section of said transfer winding of each core to the end of the lower section of the transfer winding of the adjacent core, thereby to form two parallel paths between adjacent cores which in combination with said transfer windings form a transfer loop interconnecting adjacent cores, said first and second asymmetrically conducting devices being opposingly poled to prevent current flow around said loop;

means connected between the tap points of the transfer windings of a transfer loop interconnecting adjacent cores for driving transfer currents at selected time periods through said parallel paths of said loop in the same direction, the circuit parameters being such that in the absence of bias applied to said asymmetrically conducting devices the transfer currents in said parallel paths are substantially equal thereby to apply substantially equal and opposing magnetizing forces to each of the cores associated with said loop, said last-named means comprising means for driving transfer currents through adjacent transfer loops during different time periods; means connecting the switching windings of alternate cores in series in a first circuit; means connecting the switching windings of the other alternate cores in series in a second circuit; means for driving switching current through said first circuit during a first time period and through said second circuit during a second time period to switch or to tend to switch the cores associated therewith to the "0" state, whereby in response to the actual switching of a core a voltage is induced in its transfer winding or windings to apply a forward bias to one of the asymmetrically conducting devices of the transfer loop or loops associated therewith and to apply a reverse bias to the other asymmetrically conducting device to the transfer loop, whereby any transfer currents which are flowing through the parallel paths of the transfer loop on one side of said switching core become unequal and a net magnetizing force is applied to the adjacent core associated with that transfer loop of sufficient magnitude to switch said adjacent core from the "0" to the "1" state, whereby switching of a core in response to said switching current is effective to switch an adjacent core only in the presence of transfer currents in the transfer loop interconnecting said cores.

69. In combination: first and second magnetic elements each capable of assuming either of two stable states of magnetic remanence, one of said states being considered a reference state; means for switching or tending to switch said first element to the state other than said reference state; output means coupled to said first element in which a voltage is induced when said first element switches; a transfer loop coupling said first and second elements, said transfer loop including said first-element output means, input means coupled to said second element having a tap at an intermediate point, and inhibit means to prevent the said induced voltage in said first-element output means from driving current around said loop and through said second-element output means; and shift means for controlling the state of said second element according to the state of said first element, said shift means comprising a source of shift pulse current, means for connecting one terminal of said source to said tap point on said second-element input means and the other terminal of said source to a point on said transfer loop such that two shift-current paths are established, one of said paths including at least a portion of the first element output means and at least a portion of the second element input means and the other including a different portion of the second element tapped input means, said shift current through said one branch path being in a direction to switch or tend to switch said first element to said reference state, whereby when said first element is already in said reference state during the flow of said shift current pulse said output means offers relatively low impedance to the flow of shift current therethrough, the impedances of the two branch paths being such that under these conditions the shift currents through the two tapped portions of said second-element input means establish fluxes in said second element of substantially equal magnitude and opposing polarities whereby said shift currents are ineffective to switch said second element, but whereby, when said first element is shifting from its second state to its reference state during the flow of said shift current pulse said output means offers relatively high impedance to and opposes the flow of shift current through said one path, whereby the switch currents through the two tapped portions of said second-element input means create opposing fluxes of substantially different values and a net flux is established in said second magnetic element of sufficient magnitude to switch said second element.

70. A transfer loop as defined in claim 14 wherein said input winding is tapped at an intermediate point along its length for producing substantially equal but opposing magnetic fluxes in said second element when said first element is in a static condition.

71. A magnetic device comprising in combination, at least two magnetic storage elements each exhibiting stable magnetic remanent states, means for setting a first one of said elements into one of said remanent states, a transfer winding for resetting said first element to a second remanent state, and a coupling circuit including an output winding on said first one of said element electrically connected to an input winding on a second one of said elements, means connected to two points along said coupling circuit for passing current flow from an external source therethrough, said coupling circuit having two branch current flow paths between said two points, one including at least a portion of the output winding and the other including at least a portion of the input winding, and means including said output winding for inhibiting current flow from said source in one of said branch paths in response to current flow through said transfer winding and a dynamic flux switching operation in said first element.

72. A magnetic device as defined in claim 71 wherein said current flow through the transfer winding is coexisting in time with the current flow through said branch paths.

73. A magnetic core circuit comprising first and second cores each exhibiting stable magntic remanent states, a transfer current path having two sections, a first transfer winding on the first core connected in one of said sections, a second transfer winding on the second core connected in said section, means for applying a voltage across said transfer current path to cause current flow therein, means including an advance winding on the first core for carrying an advance current coexistent in time with the first mentioned current, the arrangement being such that advance current in said advance winding in amount sufficient to but in a direction against shift of the first core will induce but a relatively low voltage in the first transfer winding, and advance current in amount sufficient to and in a direction to shift the first core will cause a relatively great E.M.F. to be induced in the first transfer winding, the second transfer winding being connected in one of the transfer current path sections so that under one condition of E.M.F. generated in the first transfer winding a sufficient current will flow in the second transfer winding to shift the second core if shiftable, and under the other condition of E.M.F. generated in the first transfer winding an insufficient current will flow in the second transfer winding to shift the second core even if shiftable.

74. A circuit as in claim 73 wherein the advance winding is connected in series with the transfer current path beyond the sections thereof and said voltage is applied across the advance winding and transfer path in series.

75. A circuit as in claim 73 wherein the first and second transfer windings are both connected in series in the same section of the transfer current path.

76. A circuit as in claim 73 wherein the interconnection between the first and second transfer windings includes two uni-directional conducting devices arranged back-to-back, and wherein the means for applying a voltage drop across said path includes at least one junction point between said uni-directional conducting devices, the arrangement being such that voltages generated in either transfer winding due to changing flux conditions on either core apart from the time of application of said voltage will be unable to affect the other core due to suppression of current in either direction by the back-to-back uni-directional conducting devices.

77. A circuit as in claim 73 wherein the first and second transfer windings are both connected in series in the same section of the transfer current path, wherein this section of the transfer current path includes a uni-directional conducting device, and wherein the other section of the transfer current path includes a uni-directional conducting device, said uni-directional conducting devices being arranged back-to-back with respect to the series circuit including same and the transfer windings.

78. A circuit as in claim 75 wherein the polarity of the first and second transfer windings with respect to one another is such that the relatively great E.M.F. generated in the first transfer winding when the first core shifts aids in driving sufficient current through the second transfer winding to shift the other core.

79. In a magnetic core circuit, at least two cores each exhibiting stable magnetic remanent states, a transfer circuit having two junction points and at least two circuit sections in parallel wtih respect to one another between said junction points, the sections being connected with respect to each other in series to form a transfer loop, at least one winding on one core and connected in one of said sections and at least one winding on the other core and connected in said one of said sections, the arrangement being such that voltage applied across the transfer circuit may transfer information stored in one of said cores to the other of said cores in dependency upon the initial state of the core from which said information is to be transferred.

80. A circuit as in claim 79 wherein the loop includes two uni-directional conducting devices connected in opposition to prevent non-transfer operations upon either core from influencing the other core, while currents in the transfer circuit may shift information as aforesaid.

81. A reversible magnetic shift register for processing information, comprising a series of register stages each having one bistable magnetic core per stage, each core having a substantially rectangular hysteresis characteristic, a transfer loop connecting each core with the succeeding core of said register, each said loop including a pair of oppositely poled unilaterally conductive elements for inhibiting circulating current in said loop in the absence of an applied conditioning signal, means for selectively applying a conditioning signal to one of said loops for selectively passing information from one of said stages to either a preceding stage or a succeeding one of said series, and means for reversing the flux in the core of said one stage during at least a portion of the time the conditioning signal is applied.

82. A transfer loop for coupling a magnetic storage element having a substantially rectangular hysteresis loop characteristic to a load, comprising two parallel branch paths, each path including a first winding coupled to said load and at least one path including a second winding on the magnetic storage element, said first windings being oriented to produce oppositely directed magnetic fields linking said load, means for providing current flow in both paths of said loop, and means for producing a flux change in said magnetic storage element to selectively inhibit the current flow in one of said parallel paths in response to signals thereby generated in said second winding.

83. A transfer loop having two parallel paths coupling two magnetic storage elements which exhibit a substantially rectangular hysteresis loop characteristic, each path including a transformer winding on a different one of said elements, means for providing current flow in parallel through such parallel paths, and winding means external to said loop but connected electrically thereto for producing a flux change in one of said elements to induce a voltage across the transformer winding on said one element and thereby selectively inhibit the current flow in one of said parallel paths of said loop.

84. A magnetic device comprising a first magnetic core and a second magnetic core, each exhibiting stable magnetic remanent states, an input winding, at least one tapped output winding and at least one advance winding on said first core, a tapped input winding and an output winding on the said second magnetic core, the end terminals of a tapped output winding of said first magnetic core being coupled with the end terminals of said tapped input winding of said second magnetic core, and means to selectively apply a conditioning current pulse to the tap of one of the tapped output windings on said first core while energizing at least one of the advance windings on said first core.

85. A magnetic device comprising first, second and third magnetic cores, each of said magnetic cores exhibiting stable magnetic remanent states, a transfer loop coupling said first and second cores including a transfer winding on said first core having its end terminals connected to the end terminals of a transfer winding on said second core, a transfer loop coupling said second and third cores including a second transfer winding on said second core having its end terminals connected to the end terminals of a transfer winding on said third core, at least one transfer winding in each of said transfer loops being tapped, at least one advance winding on said second core, and means to selectively apply a conditioning current pulse to the tap of one of said tapped transfer windings while energizing one of said advance windings on said second core so as to transfer information from said second core to either said first or said third core.

86. A magnetic device as called for in claim 85 further including a pair of asymmetrically conductive devices oppositely poled in each of said transfer loops to inhibit the flow of circulating current in said transfer loops in the absence of said circulating current.

87. A magnetic core circuit comprising two magnetic cores, each of said cores exhibiting stable magnetic remanent states, a transfer loop inter-coupling said magnetic cores, said transfer loop comprising a first transfer winding on one magnetic core, a second transfer winding on the other magnetic core, at least one of said transfer windings being a tapped winding, and a pair of oppositely poled asymmetrically conductive devices interconnecting the end terminals of said transfer windings to prevent current from circulating about the transfer loop in response to potentials generated in said transfer loop, and means for passing current from an external source through said asymmetrically conductive devices and the tap on one of said transfer windings to condition the transfer loop for transferring information when a change of remanent state is effected in either of said magnetic cores.

88. A magnetic core circuit comprising at least two magnetic cores, each of said cores exhibiting stable magnetic remanent states, a transfer loop inter-coupling said magnetic cores, said transfer loop comprising a tapped transfer winding on one magnetic core, a transfer winding on the other magnetic core, and a pair of oppositely poled asymmetrically conducting devices interconnecting the end terminals of said transfer windings to inhibit current from circulating in the transfer loop, means for passing current from an external source through said asymmetrically conducting devices and the tap on one of said transfer windings for establishing a quiescent current flow through each of said asymmetrically conducting devices, and means for reversing the magnetic flux in one of said cores while said current is flowing to generate a voltage across one of said transfer windings and thereby affect the quiescent current flowing through said asymmetrical devices.

89. A circuit comprising a bistable element exhibiting two stable remanent states, a load, a transfer loop interconnecting said bistable element and said load, the transfer loop having two branch paths extending between two terminals each including circuit means responsive to the changes in state of said element, an asymmetrically conductive device, and circuit means for imparting a voltage to said load, said asymmetrical means inhibiting circulating current flow about said circuit in the absence of an applied voltage between said two terminals, and means for applying a voltage across said two terminals to condition said transfer loop to transfer a voltage signal from the bistable device to the load when a change in remanent state is effected in said element.

90. A circuit comprising a bistable element exhibiting two stable remanent states, a load, a transfer loop interconnecting said bistable element and said load, the transfer loop having two branch paths extending between two terminals each including circuit means repsonsive to the changes in state of said element, an asymmetrically conductive device, and circuit means for imparting a voltage to said load, said asymmetrical means inhibiting circulating current flow about said circuit in the absence of an applied voltage between said two terminals, and means for applying a voltage across said two terminals to condition said transfer loop to transfer a voltage signal from the bistable device to the load when a change in remanent state is effected in said element, and means for changing the remanent state of said bistable device.

91. A circuit as in claim 90 wherein said last-mentioned means is connected electrically to one of said two terminals.

92. A reversible magnetic core register comprising a plurality of magnetic cores, each of said cores exhibiting stable magnetic remanent states, a pair of transfer loops between each pair of cores including a transfer winding on each of said cores and a pair of oppositely poled asymmetrically conductive devices interconnecting the respective end terminals of said transfer windings, at least one of said transfer windings in each transfer loop being a tapped winding, at least one advance winding on each core, and a means for selectively energizing an advance winding on at least one of said cores and for simultaneously applying a voltage to the tap of the tapped transfer winding of one of the transfer loops associated with said one core.

93. A reversible magnetic core register as in claim 92 including two advance windings on each core, one connected to the tap of the tapped transfer winding in the transfer loop connecting that core to the succeeding core, and one connected to the tap of the tapped transfer winding in the transfer loop connecting that core to a preceding core.

References Cited by the Examiner

UNITED STATES PATENTS 2,831,150 4/58 Wright et al. ---------- 340—174

IRVING L. SRAGOW, *Primary Examiner.*

EVERETT R. REYNOLDS, JOHN H. BURNS, *Examiners.*

UNITED STATES PATENT OFFICE

CERTIFICATE OF CORRECTION

Patent No. 3,199,088 August 3, 1965

John O. Paivinen

It is hereby certified that error appears in the above numbered patent requiring correction and that the said Letters Patent should read as corrected below.

Column 17, line 58, for "constructing" read -- conducting --; column 18, line 15, before "one" insert -- tap of --; column 19, line 39, strike out " and a second means,"; line 42, for "pulse" read -- pulses --; column 28, line 30, strike out -- to each second terminal of said input"; line 31, for "oriented in a direction to current flow inhibit circulating" read -- oriented in a direction to inhibit circulating current flow, --; column 30, lines 35, 36, 37 and 38, strike out "same magnetic core and the second terminal of individual ones of said third windings being connected to the tap of the input winding of the immediately preceding magnetic core"; column 31, line 45, before "one" insert -- the tap of --; column 33, line 45, strike out "response to".

Signed and sealed this 21st day of June 1966.

(SEAL)
Attest:

ERNEST W. SWIDER
Attesting Officer

EDWARD J. BRENNER
Commissioner of Patents